US012668144B2

(12) United States Patent
Jorgenson et al.

(10) Patent No.: US 12,668,144 B2
(45) Date of Patent: Jun. 30, 2026

(54) SYSTEM AND METHOD FOR RENEWABLE ENERGY BASED EV CHARGING AND HYDROGEN FUELING

(71) Applicant: BWR Innovations LLC, Fargo, ND (US)

(72) Inventors: Joel A. Jorgenson, Fargo, ND (US); Adam C. Jorgenson, West Fargo, ND (US); Thomas W. Nelson, Fargo, ND (US); Neal O. Haaland, Fargo, ND (US)

(73) Assignee: BWR Innovations LLC, West Fargo, ND (US)

( * ) Notice: Subject to any disclaimer, the term of this patent is extended or adjusted under 35 U.S.C. 154(b) by 725 days.

(21) Appl. No.: 18/162,023

(22) Filed: Jan. 31, 2023

(65) Prior Publication Data

US 2023/0256848 A1    Aug. 17, 2023

Related U.S. Application Data

(60) Provisional application No. 63/309,128, filed on Feb. 11, 2022.

(51) Int. Cl.
*H01M 10/46* (2006.01)
*B60L 53/54* (2019.01)
(Continued)

(52) U.S. Cl.
CPC .............. *B60L 53/54* (2019.02); *B60L 53/65* (2019.02); *B60L 53/68* (2019.02); *B60S 5/02* (2013.01);
(Continued)

(58) Field of Classification Search
CPC .. H02J 7/0044; H01M 10/44; H01M 2220/20; H01M 2250/20; H01M 2250/10;
(Continued)

(56) References Cited

U.S. PATENT DOCUMENTS 3,784,896 A    1/1974  Lakota
4,905,134 A    2/1990  Recker
(Continued)

FOREIGN PATENT DOCUMENTS

CN    212726480 U    3/2021
WO    2002066974 A2   8/2002

OTHER PUBLICATIONS

Machine translation of CN212726480U (Mar. 16, 2021) (Year: 2021).*

(Continued)

*Primary Examiner* — Edward Tso
(74) *Attorney, Agent, or Firm* — Neustel Law Offices

(57) ABSTRACT

A system for electric vehicle charging and hydrogen fueling leverages existing infrastructure of a localized renewable energy microgrid and utilizes excess generated energy to power an electrolyzer to produce hydrogen gas on site that is compressed and stored in a pressure vessel. A first portion of the stored hydrogen gas may be used for hydrogen fueling of a fuel cell electric vehicle (FCEV) via a hydrogen fuel dispenser that is provided at a charging station. A second portion of the stored hydrogen gas may be converted into electricity through use of one or more fuel cells. The generated electricity may be used for charging a battery of a battery electric vehicle (BEV) via an electric vehicle charging dispenser that is also provided at the charging station.

20 Claims, 10 Drawing Sheets

(51) Int. Cl.

| | |
|---|---|
| *B60L 53/65* | (2019.01) |
| *B60L 53/68* | (2019.01) |
| *B60S 5/02* | (2006.01) |
| *C25B 1/04* | (2021.01) |
| *C25B 15/08* | (2006.01) |
| *H01M 8/04082* | (2016.01) |
| *H01M 8/0438* | (2016.01) |
| *H01M 8/04537* | (2016.01) |
| *H01M 8/04858* | (2016.01) |
| *H01M 8/0656* | (2016.01) |
| *H01M 10/44* | (2006.01) |

(52) U.S. Cl.
CPC ................ *C25B 1/04* (2013.01); *C25B 15/08* (2013.01); *H01M 8/04201* (2013.01); *H01M 8/04425* (2013.01); *H01M 8/04626* (2013.01); *H01M 8/04947* (2013.01); *H01M 8/0656* (2013.01); *H01M 10/44* (2013.01); *B60L 2210/40* (2013.01); *H01M 2220/20* (2013.01); *H01M 2250/10* (2013.01); *H01M 2250/20* (2013.01)

(58) Field of Classification Search
CPC ........... H01M 16/006; H01M 8/04201; H01M 8/04947; B60L 53/54; B60L 53/68; B60L 53/65; C25B 1/04; C25B 15/08; B60S 5/02
USPC ......................... 320/107, 109, 132, 149, 101
See application file for complete search history.

(56) References Cited

U.S. PATENT DOCUMENTS

| | | | |
|---|---|---|---|
| 4,937,462 A | 6/1990 | Recker | |
| 5,317,500 A | 5/1994 | Iden | |
| 5,642,006 A | 6/1997 | Cech | |
| 5,767,591 A | 6/1998 | Pinkerton | |
| 6,080,500 A | 6/2000 | Fuju | |
| 6,112,136 A | 8/2000 | Paul | |
| 6,169,390 B1 | 1/2001 | Jungreis | |
| 6,172,432 B1 | 1/2001 | Schnakenberg | |
| 6,184,593 B1 | 2/2001 | Jungreis | |
| 6,239,997 B1 | 5/2001 | Deng | |
| 6,503,649 B1 | 1/2003 | Czajkowski | |
| 6,657,319 B2 | 12/2003 | Sanada | |
| 7,180,210 B1 | 2/2007 | Jorgenson | |
| 7,222,001 B2 | 5/2007 | Frost | |
| 8,203,231 B2 | 6/2012 | Knepple | |
| 8,347,645 B1 | 1/2013 | Miller | |
| 11,018,508 B1 | 5/2021 | Jorgenson | |
| 11,139,488 B2 | 10/2021 | Jorgenson | |
| 11,152,814 B2 * | 10/2021 | Martin | B60L 53/35 |
| 11,236,864 B1 | 2/2022 | Ewan | |
| 2002/0114983 A1 | 8/2002 | Frank | |
| 2003/0064260 A1 | 4/2003 | Erdle | |
| 2005/0183895 A1 | 8/2005 | Severns | |
| 2007/0193999 A1 | 8/2007 | Peterson | |
| 2007/0264537 A1 | 11/2007 | Huang | |
| 2009/0025315 A1 | 1/2009 | Gutfleisch | |
| 2009/0055031 A1 | 2/2009 | Slota | |
| 2009/0072791 A1 | 3/2009 | Morita | |
| 2009/0313896 A1 | 12/2009 | Glidewell | |
| 2012/0139354 A1 | 6/2012 | Said | |
| 2013/0183749 A1 | 7/2013 | Aamodt | |
| 2015/0217869 A1 | 8/2015 | Brunaux | |
| 2016/0009192 A1 * | 1/2016 | Zhang | G06Q 50/06 320/109 |
| 2016/0134124 A1 | 5/2016 | Kaag | |
| 2016/0339776 A1 | 11/2016 | Oyobe | |
| 2017/0301970 A1 | 10/2017 | Rodriguez | |
| 2017/0314143 A1 | 11/2017 | Emerick | |
| 2018/0093655 A1 | 4/2018 | Healy | |
| 2019/0263277 A1 | 8/2019 | Srinivasan | |
| 2019/0321500 A1 | 10/2019 | Anderson | |
| 2020/0075972 A1 | 3/2020 | Jorgenson | |
| 2020/0238839 A1 | 7/2020 | Miyaki | |
| 2021/0261010 A1 * | 8/2021 | Pickles | B60L 50/75 |
| 2022/0123557 A1 | 4/2022 | Wollin | |
| 2022/0397239 A1 * | 12/2022 | Jorgenson | F17C 5/06 |
| 2023/0048237 A1 | 2/2023 | Springer | |

OTHER PUBLICATIONS

PCT Search Report and Written Opinion for US/PCT2023/012202; Apr. 14, 2023.
SYNCHROTACT 5 Synchronizing and Paralleling Equipment and Systems for Synchronous Machines and Networks by ABB Automation; Exact Publication Date Unknown (Prior to Apr. 2004).
A Fast Following Synchronizer of Generators; IEEE Transaction of Energy Conversion, vol. 3, No. 4; Dec. 1988.
High Integrity Power Control Systems for Critical Facilities by Russelectric; Exact Publication Date Unknown (Prior to Apr. 2004).
PCT International Search Report and Written Opinion for PCT/US2020/015545; Received on Apr. 28, 2020.
https://www.energy.gov/eere/fuelcells/fuel-cell-systems; Office of Energy Efficiency & Renewal Energy "Fuel Cell Systems"; Department of Energy; Janaury 26, 2017.
https://www.cdc.gov/infectioncontrol/pdf/guidelines/disinfection-guidelines-H.pdf; CDC "Guideline for Disinfection and Sterilization in Healthcare Facilities" Rutala; Department of Health and Human Services; 2008.
https://energy.gov/sites/default/files/2015/11/f27/fcto_fuel_cells_fact_sheet.pdf; Fuel Cells Technologies Office Fuel Cells Fact Sheet; Nov. 2015.
http://www.altergy.com/wp-content/uploads/2017/09/Altergy_Cable_Data_sheet_ATP_web.pdf; Altergy Cable/Multiple-System Operators Data Sheet; Received Aug. 28, 2019.
http://www.altergy.com/wp-content/uploads/2016/08/Altergy_CorpBro_Web_singlePg.pdf; Altergy Corporate Brochure; Received Aug. 28, 2019.
http://www.altergy.com/wp-content/uploads/2017/09/Altergy_Nacelle_Data_sheet_ATP_web.pdf; Altergy Freedom Power System Nacelle Data Sheet; Published Feb. 2017.
http://www.altergy.com/wp-content/uploads/2017/09/Altergy_PSP_Data_sheet_6_ATP_web.pdf; Altergy Public Safety Platform Data Sheet; Published 2017.
http://www.altergy.com/wp-content/uploads/2017/09/Altergy_Reformer_Data_sheet_7_ATP_web.pdf; Altergy Freedom Power System (FPS-EX) Data Sheet; Published Jun. 2018.
http://www.altergy.com/wp-content/uploads/2018/07/Altergy_TSP_Data_sheet_2018_ATP_web.pdf; Altergy Traffic Signal Platform (TSP) Data Sheet; Published 2018.
http://www.altergy.com/products-2/enclosures/; Altergy Enclosures Webpage; Received Aug. 28, 2019.
http://www.altergy.com/products-2/mobile-solutions/; Altergy Mobile Solutions Webpage; Received Aug. 28, 2019.
https://www.hydrogenics.com/hydrogen-products-solutions/fuel-cell-power-systems/; Hydrogenics HyPM-HD Power Modules Brochure; Published Feb. 2018.
https://www.hydrogenics.com/technology-resources/media-downloads-table/; Hydrogenics HyPM-XR Back-Up Power Fuel Cell Brochure; Published May 2016.
https://www.hydrogenics.com/technology-resources/media-downloads-table/; Hydrogenics HyPM Rack Brochure; Published Mar. 2014.
https://www.intelligent-energy.com/uploads/product_docs/49087_IE_-_FCM_brochure_May_2018.pdf; Intelligent Energy 800 Series Fuel Cell Module Brochure; Published May 2018.
https://www.intelligent-energy.com/uploads/product_docs/Final_UAV_brochure_Sept_2018_web.pdf Intelligent Energy UAV Fuel Cell Power Module Brochure; Published Aug. 2018.
https://www.plugpower.com/wp-content/uploads/2016/03/2016_GenKey_Stationary020816.pdf; Plug Power GenKey for Stationary Power Brochure; Published Feb. 8, 2016.
https://www.plugpower.com/wp-content/uploads/2018/06/2018GenKeyBrochure_F1Digi-1.pdf; Plug Power GenKey for Material Handling Brochure; Published Jun. 2018.

(56) References Cited

OTHER PUBLICATIONS https://www.plugpower.com/products/progen/fuel-cells-for-industrial-robotics/; Plug Power ProGen Fuel Cells for Industrial Robotics Webpage; Received Aug. 28, 2019.

https://www.arema.org/files/library/2014_Conference_Proceedings/ Fuel_Cell_Technology_For_Backup_And_Supplemental_Power_ Applications.pdf; Arema Fuel Cell Article; Jun. 13, 2014.

https://www.plugpower.com/wp-content/uploads/2015/05/Intelec2011_ ReliOn_P081_IEEE.pdf; ReliOn Smart Energy Solutions Article; Joe Blanchard; Published Nov. 2011.

https://www.plugpower.com/wp-content/uploads/2015/05/ ReliOnIntelec_2013Paper.pdf; ReliOn Superstorm Sandy: Fuel Cell Design Article; Spink and Saathoff; Published 2013.

https://www.plugpower.com/wp-content/uploads/2018/06/2018_ GenFuelSpec_F1Digi.pdf; Plug Power GenFuel Hydrogen Solutions for Material Handling Applications; Published Jun. 2018.

https://www.plugpower.com/wp-content/uploads/2016/03/ GenSureProductCatalogsm_012716.pdf; Plug Power GenSure Fuel Cell Systems Product Catalog; Published Mar. 2016.

https://www.plugpower.com/wp-content/uploads/2014/12/ ColdStorageDigi_F_101716.pdf; Plug Power GenDrive Fuel Cells for Cold Chain Environments Brochure; Published Dec. 2014.

https://www.plugpower.com/wp-content/uploads/2016/07/Mfg_mktg_ Final072216.pdf; Plug Power Fuel Cells for Manufacturing Facilities Brochure; Published Jul. 2016.

https://www.plugpower.com/wp-content/uploads/2019/04/ProGenSpec_ Mobility_Digi0219.pdf; Plug Power ProGen Fuel Cell Power for E-Mobility Applications; Published Apr. 2019.

PCT International Search Report and Written Opinion for PCT/ US2019/48543; Nov. 27, 2019.

PCT Search Report and Written Opinion for PCT/US21/47451; Dec. 6, 2021.

* cited by examiner

FIG. 6

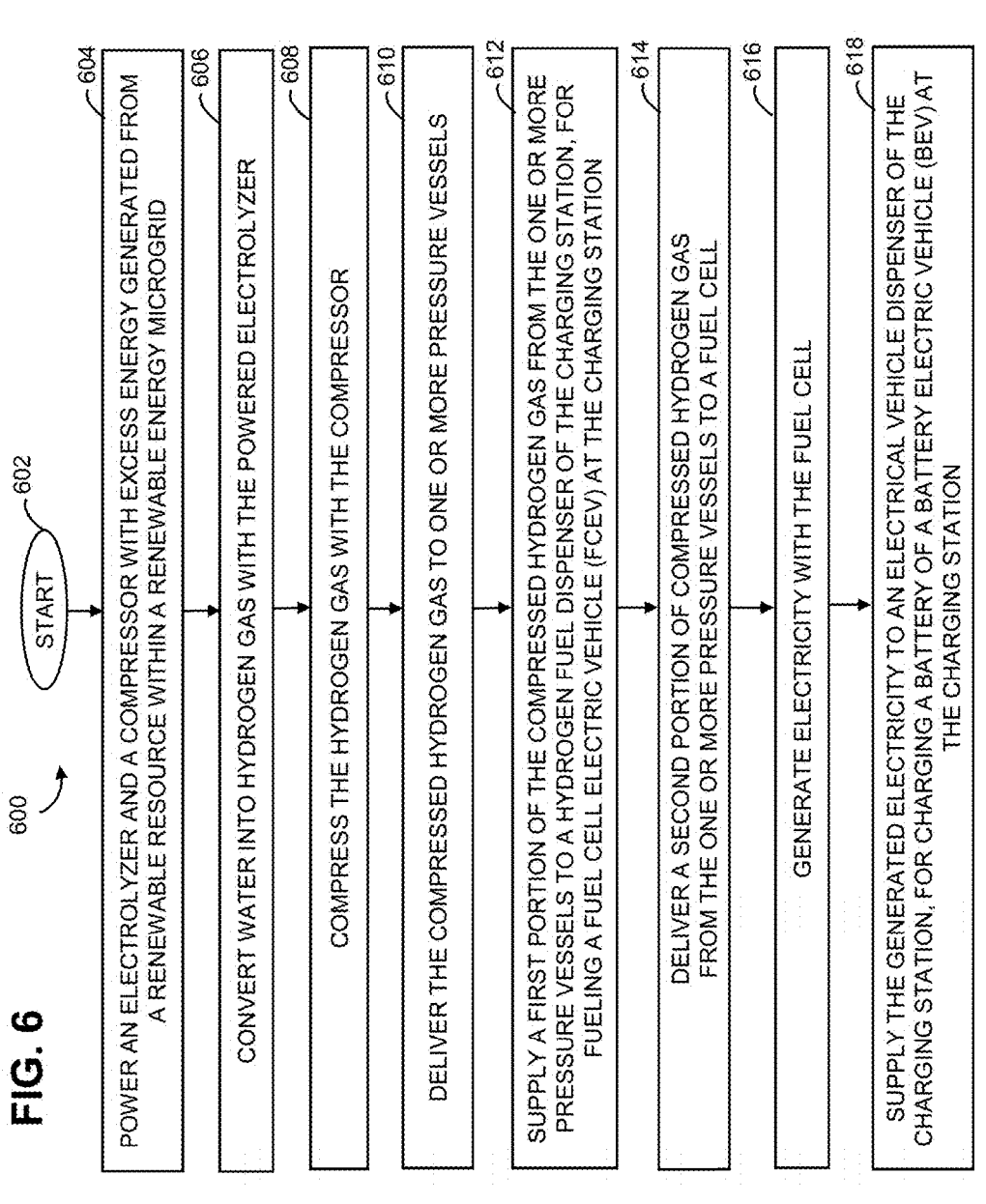

600

START — 602

POWER AN ELECTROLYZER AND A COMPRESSOR WITH EXCESS ENERGY GENERATED FROM A RENEWABLE RESOURCE WITHIN A RENEWABLE ENERGY MICROGRID — 604

CONVERT WATER INTO HYDROGEN GAS WITH THE POWERED ELECTROLYZER — 606

COMPRESS THE HYDROGEN GAS WITH THE COMPRESSOR — 608

DELIVER THE COMPRESSED HYDROGEN GAS TO ONE OR MORE PRESSURE VESSELS — 610

SUPPLY A FIRST PORTION OF THE COMPRESSED HYDROGEN GAS FROM THE ONE OR MORE PRESSURE VESSELS TO A HYDROGEN FUEL DISPENSER OF THE CHARGING STATION, FOR FUELING A FUEL CELL ELECTRIC VEHICLE (FCEV) AT THE CHARGING STATION — 612

DELIVER A SECOND PORTION OF COMPRESSED HYDROGEN GAS FROM THE ONE OR MORE PRESSURE VESSELS TO A FUEL CELL — 614

GENERATE ELECTRICITY WITH THE FUEL CELL — 616

SUPPLY THE GENERATED ELECTRICITY TO AN ELECTRICAL VEHICLE DISPENSER OF THE CHARGING STATION, FOR CHARGING A BATTERY OF A BATTERY ELECTRIC VEHICLE (BEV) AT THE CHARGING STATION — 618

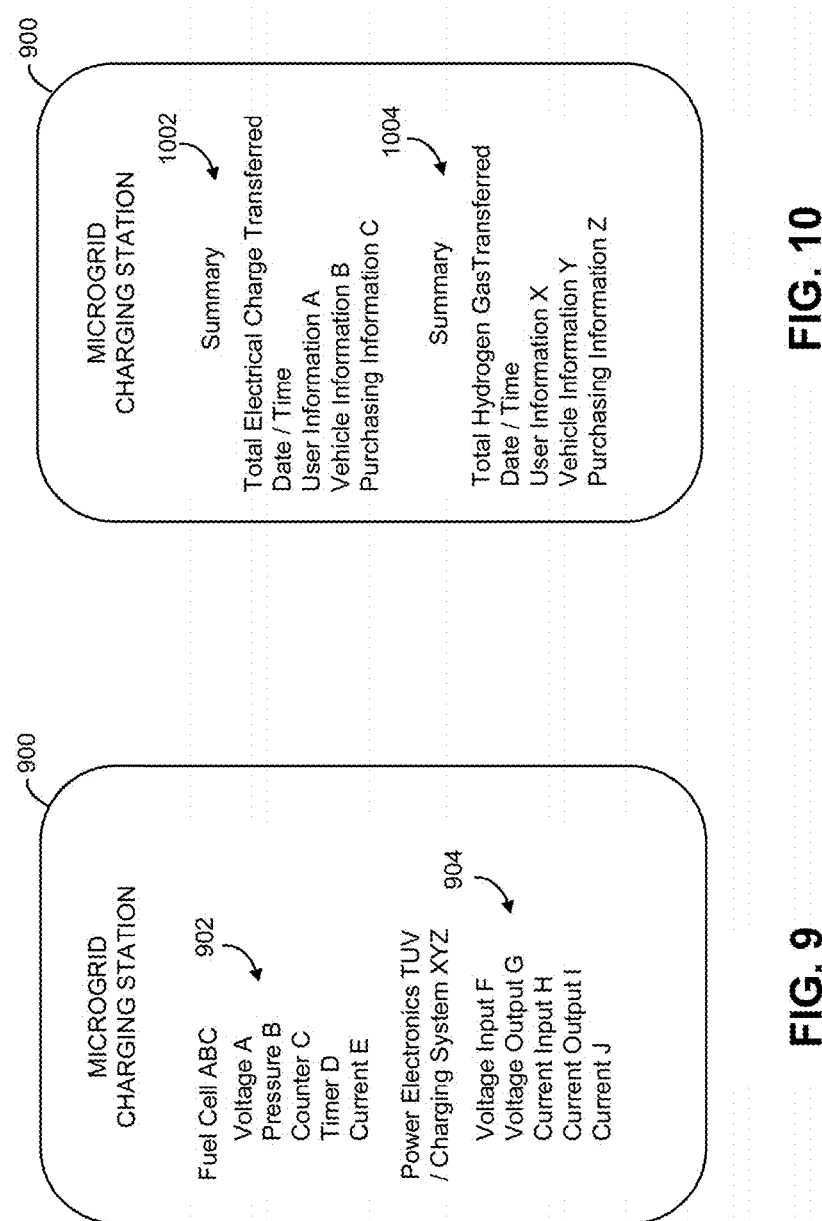

MICROGRID
CHARGING STATION

1002

Summary

Total Electrical Charge Transferred
Date / Time
User Information A
Vehicle Information B
Purchasing Information C

1004

Summary

Total Hydrogen Gas Transferred
Date / Time
User Information X
Vehicle Information Y
Purchasing Information Z

MICROGRID
CHARGING STATION

Fuel Cell ABC    902

Voltage A
Pressure B
Counter C
Timer D
Current E

Power Electronics TUV
/ Charging System XYZ    904

Voltage Input F
Voltage Output G
Current Input H
Current Output I
Current J

SYSTEM AND METHOD FOR RENEWABLE ENERGY BASED EV CHARGING AND HYDROGEN FUELING

CROSS REFERENCE TO RELATED APPLICATIONS

I hereby claim benefit under Title 35, United States Code, Section 119(e) of U.S. provisional patent application Ser. No. 63/309,128 filed Feb. 11, 2022. The 63/309,128 application is currently pending. The 63/309,128 application is hereby incorporated by reference into this application.

STATEMENT REGARDING FEDERALLY SPONSORED RESEARCH OR DEVELOPMENT

Not applicable to this application.

BACKGROUND

The described example embodiments in general relate to the providing of an infrastructure for both electric vehicle charging of battery electric vehicles and hydrogen fueling of fuel cell electric vehicles.

Electric vehicles are unquestionably the future of transportation. Many automobile manufacturers have announced the forecasted end of vehicles using internal combustion engines (ICEs). New car designs will use electricity to directly power motors for propulsion, and existing vehicles will utilize retrofit kits to install electric drive systems.

Electric vehicles may be generally classified into one of two different categories based on the type of energy storage. Battery electric vehicles (BEVs) use batteries to store electric charge, directly connecting battery packs to the electric motors. On the other hand, fuel cell electric vehicles (FCEVs) use hydrogen, hydrocarbons, ammonia, or other feedstocks to electrochemically produce electricity. The feedstock is stored in vessels, either pressurized gaseous tanks or liquid tanks. An optional reformed may be used to create a transitional stage of creating pressurized hydrogen from a liquid feedstock.

Currently, ICE vehicles have a large network of fuel pumps providing gasoline and/or diesel. On the other hand, there is a notable lack of a widely-available infrastructure for the charging and/or refueling of electrical vehicles. With respect to many emerging products, a circular argument exists that a new product cannot exist without the development of infrastructure, and infrastructure cannot be developed without a new product release.

To be sure, electrical vehicles lack the widespread refueling infrastructure of ICE vehicles. ICE vehicles have the large network of fuel pumps, whereas charging stations for BEVs are few and widespread. Refueling stations for FCEVs are even more sparse, for example, with locations only along the coastal areas of the United States. Without adequate infrastructure, the adoption of electric vehicles is limited. This is a particular problem for trucking and commercial traffic. The lack of charging and refueling provides a hindrance to commercial traffic and economic development, and results in increased shipping costs and shipping delays.

A traditional means to provide electrical recharging for BEVs involves a direct connection to the electrical grid. However, the electrical grid of the United States and most other countries are already overwhelmed, and the additional demand of BEV charging stations exceeds the capacity of electrical generation systems. As is apparent, a BEV charging system that only uses electrical grid connections shifts the problem of insufficient BEV charging to an already-overworked electrical grid. On the other hand, hydrogen fueling infrastructure for FCEVs is nascent and does not have a defined distribution network. Hydrogen is often distributed via tanker trucks and in limited supplies through pipelines. However, this distribution method is fragmented and unable to supply hydrogen in a broad scale.

SUMMARY

The present disclosure is directed to extending the capability of a renewable energy microgrid and utilizing its excess energy to provide an electric vehicle charging and hydrogen fueling system. The present disclosure uniquely solves the charging and hydrogen fueling infrastructure problem with the creation of a charging station for electric vehicles, both battery and fuel cell vehicles, without burdening the electrical grid or shifting demand to other areas of electrical distribution.

In certain aspects, the present disclosure is directed to an electric vehicle charging and hydrogen fueling system that can be added onto a renewable energy microgrid. This system may include an electrolyzer, a compressor, one or more pressure vessels, a fuel cell, and a charging station, each of which is located at the renewable energy microgrid.

The electrolyzer utilizes excess energy from the renewable energy microgrid to convert water into elemental hydrogen gas and oxygen gas. The compressor accepts the hydrogen gas from the electrolyzer, pressurizes the hydrogen gas, and delivers the pressurized hydrogen gas to the pressure vessel for storage. The stored hydrogen gas is used locally as a fuel to be dispensed via a hydrogen gas dispenser of the charging station, for fueling a fuel cell electric vehicle at the charging station. The stored hydrogen gas is also used to generate electricity with the fuel cell, which is used locally to be dispensed via an electric vehicle charging dispenser of the charging station, for charging a battery of a battery electric vehicle at the charging station.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

FIG. 6 is a flowchart for describing a method for electric vehicle charging and hydrogen fueling at a charging station located at a renewable energy microgrid according to some embodiments of the present disclosure.

FIGS. 9 and 10 are illustrative representations of a display of a computing device for a visual presentation of monitored information of the EV charging/fueling system of FIG. 2, for monitoring and control over the system.

DETAILED DESCRIPTION

A. Overview

Figure 1:
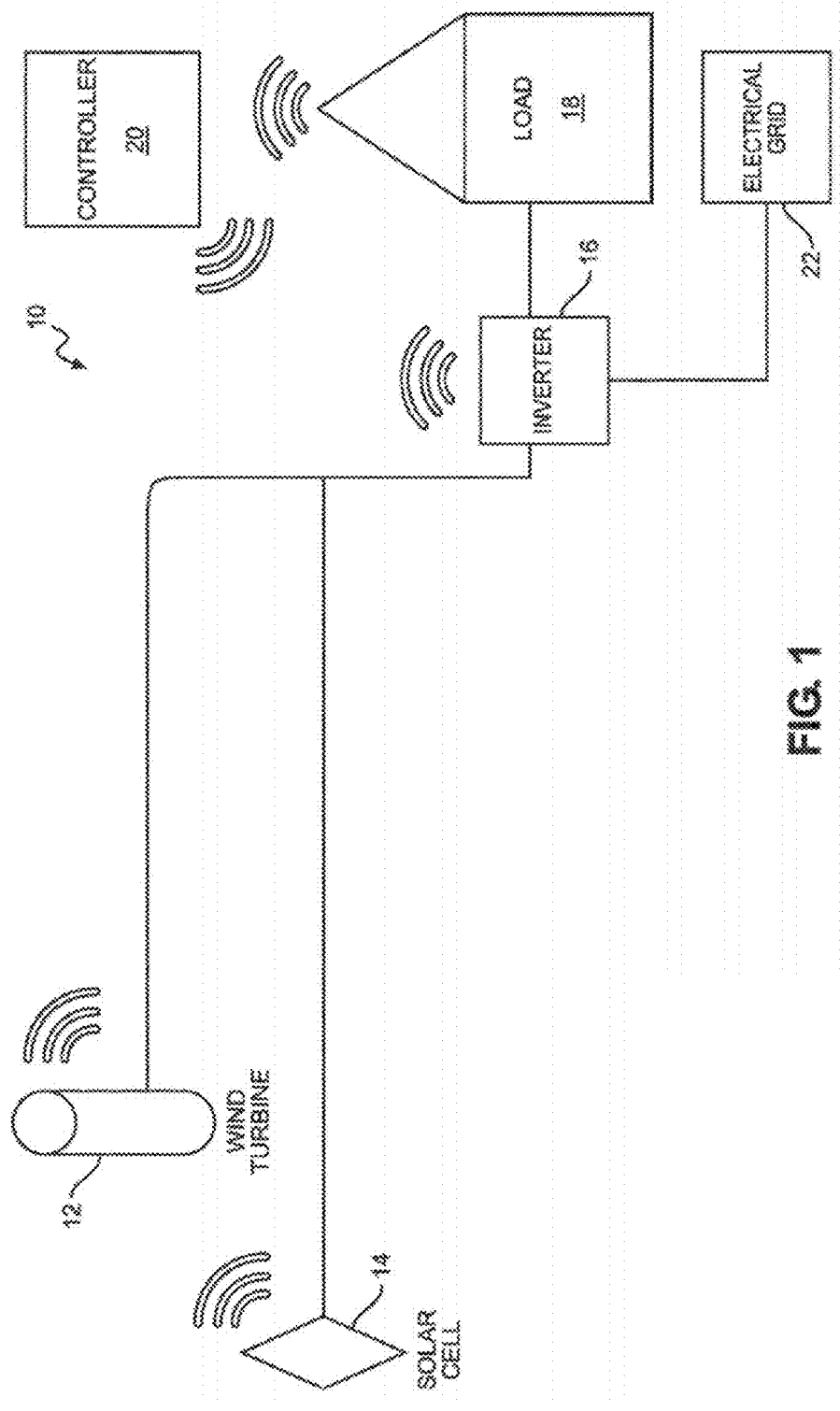
FIG. 1 illustrates a top-level example configuration of a renewable energy microgrid.

The various embodiments of the present disclosure relate to a system and method for electric vehicle charging and hydrogen fueling that leverages existing infrastructure of a localized renewable energy microgrid, utilizing excess generated energy therefrom to power an electrolyzer to produce hydrogen gas that is compressed and stored in a pressure vessel. A first portion of the stored hydrogen gas is used for hydrogen fueling of a fuel cell electric vehicle (FCEV) via a hydrogen fuel dispenser that is provided at a charging station located at the microgrid. A second portion of the stored hydrogen gas is converted into electricity through use of one or more fuel cells. The generated electricity is used for charging a battery of a battery electric vehicle (BEV) via an electric vehicle charging dispenser that is also provided at the charging station located at the microgrid.

In certain aspects, the present disclosure is directed to a method for electric vehicle charging and hydrogen fueling at a charging station 25 located at a renewable energy microgrid 10. The method includes (a) powering an electrolyzer 40 and a compressor 50 with excess energy generated from a renewable resource 12, 14 within the renewable energy microgrid 10; (b) converting water into hydrogen gas with the powered electrolyzer 40; (c) compressing the hydrogen gas with the compressor 50; (d) delivering the compressed hydrogen gas to one or more pressure vessels 60; (e) supplying at least a first portion of the compressed hydrogen gas from the one or more pressure vessels 60 to a hydrogen fuel dispenser 54 of the charging station 25, for fueling a fuel cell electric vehicle 55 at the charging station 25; (f) delivering at least a second portion of the compressed hydrogen gas from the one or more pressure vessels 60 to a fuel cell 70; (g) generating electricity with the fuel cell 70; and (h) supplying the generated electricity to an electric vehicle charging dispenser 58 of the charging station 25, for charging a battery of a battery electric vehicle 60 at the charging station 25.

In certain aspects, the generating of the electricity with the fuel cell 70 further comprises combining oxygen gas with the at least second portion of the compressed hydrogen gas at the fuel cell 70. In certain aspects, the method for electric vehicle charging and hydrogen fueling additionally includes (a) converting a direct current (DC) signal of the generated electricity to an alternating current (AC) signal; and (b) supplying the AC signal to a charging system 56 coupled to the electric vehicle charging dispenser 58; and (c) charging the battery with use of the charging system 56. In certain aspects, the charging system 56 comprises a plurality of charging circuits 406, and the method for electric vehicle charging and hydrogen fueling additionally includes (a) selecting one of the plurality of charging circuits 406 based at least on vehicle or battery type information of the battery electric vehicle 60; and (b) operating the selected charging circuit 408 for charging the battery.

In certain aspects, the charging system 56 comprises a smart charging system 702. In certain aspects, the method for electric vehicle charging and hydrogen fueling additionally includes, at the smart charging system 702, receiving, from a controller 80, 96, instructions for controlling the charging of the battery. In certain aspects, the method for electric vehicle charging and hydrogen fueling additional includes, at the smart charging system 702, receiving, from the controller 80, 96, a charging profile for controlling the charging of the battery.

In certain aspects, the method for electric vehicle charging and hydrogen fueling additionally includes, at a controller 80, 96, (a) monitoring and collecting hydrogen gas transfer information associated with the hydrogen fueling of the fuel cell electric vehicle 55; (b) monitoring and collecting charge transfer information associated with the charging of the battery of the battery electric vehicle 60.

In certain aspects, the present disclosure is directed to a system for electric vehicle charging and hydrogen fueling at a charging station 25 located at a renewable energy microgrid 10. The system may be referred to as an EV charging/fueling system 35. The EV charging/fueling system 35 includes an electrolyzer 40, a compressor 50, one or more pressure vessels 60, and a fuel cell 70. The charging station 25 includes a hydrogen fuel dispenser 54 and an electric vehicle charging dispenser 58. The electrolyzer 40 receives power by excess energy generated by a renewable resource 12, 14 of the renewable energy microgrid 10, and operates to produce hydrogen gas from water. The compressor 50 receives power by the energy generated by the renewable resource 12, 14 of the renewable energy microgrid 10, and operates to compress the hydrogen gas. The one or more pressure vessels 60 store the compressed hydrogen gas. The hydrogen fuel dispenser 54 of the charging station 25 receives supply of at least a first portion of the compressed hydrogen gas from the one or more pressure vessels 60 for fueling a fuel cell electric vehicle 55 at the charging station 25. The fuel cell 70 receives at least a second portion of the compressed hydrogen gas from the one or more pressure vessels 60, and operates to generate electricity based on the at least second portion of the compressed hydrogen gas. The electric vehicle charging dispenser 58 of the charging station 25 receives supply of the generated electricity for charging a battery of a battery electric vehicle 60 at the charging station 25.

In some aspects, the fuel cell 70 further operates to generate the electricity based on a combination of oxygen gas with the at least second portion of the compressed hydrogen gas. In some aspects, the system additionally includes an inverter 310 that converts a DC signal of the generated electricity to an AC signal; and a charging system 56 that receives the AC signal and is coupled to the electric vehicle charging dispenser 58 for the charging of the battery.

In some aspects, the EV charging/fueling system 35 additionally includes charging circuitry 405 having a plurality of charging circuits 406 and a controller 410 that selects one of the plurality of charging circuits 506 based at least on vehicle or battery type information of the battery electric vehicle 60, and operates the selected charging circuit 408 for the charging of the battery.

In some aspects, the charging system 56 comprises a smart charging system 702. The smart charging system 702 further includes charging circuitry 405 and a first controller 410 that receives, from a second controller 80, 96, instructions for controlling the charging circuitry 405 for the charging of the battery. In some aspects, the smart charging system 702 further includes a first controller 410 that receives, from a second controller 80, 96, a charging profile for controlling the charging circuitry 405 for the charging of the battery.

In some aspects, the EV charging/fueling system 35 additionally includes a controller 80, 96 that monitors and collects hydrogen gas transfer information associated with the hydrogen fueling of the fuel cell electric vehicle 55, and further monitors and collects charge transfer information associated with the charging of the battery of the battery electric vehicle 60.

In certain aspects, the present disclosure is directed to another system for electric vehicle charging and hydrogen fueling at a charging station 25 located at a renewable energy microgrid 10. This system may also be referred to as an EV charging/fueling system 35. The EV charging/fueling system 35 includes an electrolyzer 40, a compressor 50, one or more pressure vessels 60, a fuel cell 70, power electronics circuitry 74, and a smart charging system 702. The charging station 25 includes a hydrogen fuel dispenser 54 and an electric vehicle charging dispenser 58. The electrolyzer 40 receives power by excess energy generated by a renewable resource 12, 14 of the renewable energy microgrid 10, and operates to produce hydrogen gas from water. The compressor 50 receives power by the energy generated by the renewable resource 12, 14 of the renewable energy microgrid 10, and operates to compress the hydrogen gas. The one or more pressure vessels 60 store the compressed hydrogen gas. The hydrogen fuel dispenser 54 of the charging station 25 receives supply of at least a first portion of the compressed hydrogen gas from the one or more pressure vessels 60 for fueling a fuel cell electric vehicle 55 at the charging station 25.

The fuel cell 70 receives at least a second portion of the compressed hydrogen gas from the one or more pressure vessels 60, and operates to generate electricity based on the at least second portion of the compressed hydrogen gas and oxygen gas. The power electronics circuitry 74 is coupled to receive the generated electricity from the fuel cell 70. The power electronics circuitry 74 is further coupled to the smart charging system 702, which includes charging circuitry 405 and a controller 410. The controller 410 operates to interface for communication with a cloud controller 96 for controlling the charging circuitry 405. The charging circuitry 405 is coupled to the electric vehicle charging dispenser 58 of the charging station 25 for charging a battery of a battery electric vehicle 60 at the charging station 25.

In some aspects, the power electronics circuitry 74 additionally includes an inverter 310 that converts a DC signal of the generated electricity to an AC signal. In some aspects, the controller 410 of the smart charging system 702 operates to receive, from the cloud controller 96, instructions for controlling the charging circuitry 405 for the charging of the battery. In some aspects, the controller 410 of the smart charging system 702 operates to receive, from the cloud controller 96, a charging profile having instructions for controlling the charging circuitry 405 for the charging of the battery. In some aspects, the controller 410 of the smart charging system 402 operates to interface for communication with the cloud controller 96 comprising a cloud-based server. In some aspects, the controller 410 of the smart charging system 702 operates to interface for communication with the cloud controller 96 comprising a charging point operator.

B. Renewable Energy Microgrid

A renewable energy microgrid is a self-sufficient energy system that serves a discrete geographic footprint, such as a college campus, hospital complex, business center or neighborhood. Within a renewable energy microgrid are one or more kinds of distributed energy (e.g., wind, solar, biomass, nuclear, and other types of energy generated from resources that are not fossil fuel based) that produce its power. The renewable energy microgrid is a form of local energy that is generally independent (e.g., the renewable energy microgrid can disconnect from the central grid and operate independently). The renewable energy microgrid is intelligent by utilizing a controller to orchestrate multiple renewable energy resources to meet the energy requirements of customers of the renewable energy microgrid.

Within the renewable energy microgrid, wind energy may be converted to direct current electricity through the use of wind turbines and/or wind generators. Solar energy may be converted to direct current electricity through the use of photovoltaic devices. Biomass may be converted to direct current electricity through anaerobic digestion, burning, or through conversion to a gas or liquid fuel. In all cases, the renewable resources are consumed to produce electricity that is directly consumable at the point of production.

A top-level example architecture of a renewable energy microgrid 10 is illustrated in FIG. 1. As shown in this example, the renewable energy microgrid 10 generally includes the components of a wind turbine 12, a solar cell 14, an inverter 16, a load 18 (e.g., the site to be powered), and a microgrid controller 20. In operation, a network of transducers, sensors, and other communicating electronics across the renewable energy microgrid 10 are in communication with the microgrid controller 20, to determine operating conditions and provide precise control and oversight of the components of the renewable energy microgrid 10.

For example, based on the forecast or detection of a bright sunny day, the microgrid controller 20 may direct the engagement of the photovoltaic cells of the solar cell 14 to convert solar energy into direct current electricity. Similarly, during windy conditions, the microgrid controller 20 additionally, or alternatively, may direct the engagement of the wind turbine 12 (and/or generators) to convert direct wind energy into direct current electricity. All operations of biomass conversion, from the magnitude of the available biomass source to the processing steps, may be directed to produce electricity from biomass when desired and/or to disengage when biomass-produced electricity is not needed or is unavailable.

The microgrid controller 20 orchestrates supplying the direct current electricity to the invertor 16 for conversion to alternating current (single phase or multi-phase) and further orchestrates the delivery of the AC power output of the inverter 16 to the load 18. The inverter 16 is additionally coupled to an electrical grid 22 (e.g., an interconnected network providing power generation, transmission and distribution of electricity from producers to consumers). In the renewable energy microgrid 10 of FIG. 1, excess energy generated by the renewable resources is often wasted. In some instances, the microgrid controller 20 monitors the electrical grid 22 for opportunities to sell electricity to the grid 22.

The renewable energy microgrid 10 may include circuitry and components that interact with the microgrid controller 20 to enable maximum power point tracking, signal and voltage conditioning, transient management, and load smoothing. These components and circuits are included into the design and implementation of the microgrid 10 to provide the maximum possible power transfer and to mitigate downstream impact on variable and intermittent power delivery.

C. Renewable Energy Microgrid with EV Charging and Fueling System

Figure 2:
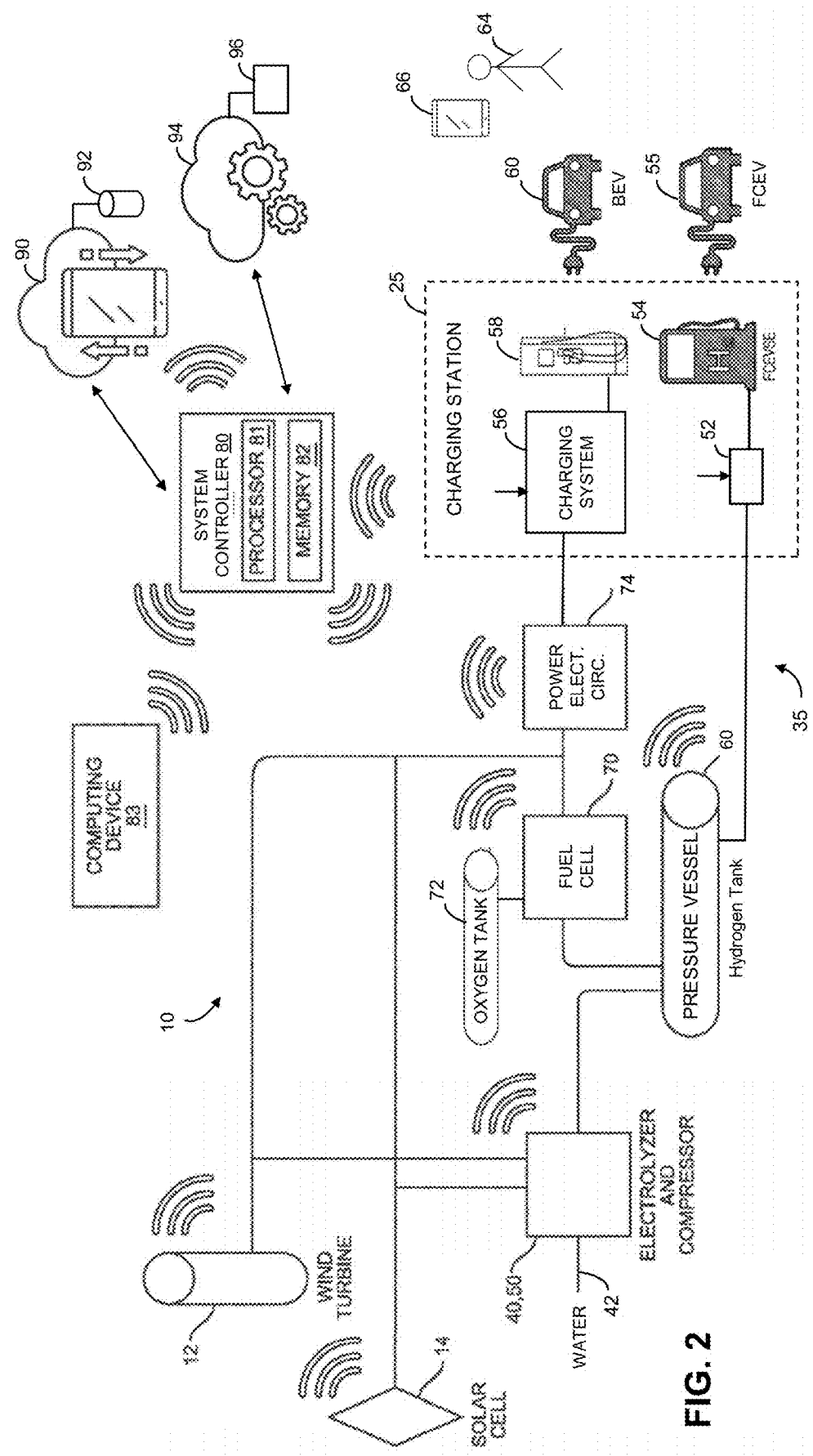
FIG. 2 illustrates the top-level example configuration of a renewable energy microgrid of FIG. 1, with the addition of a system for electric vehicle (EV) charging and hydrogen fueling ("EV charging/fueling system") at a charging station according to some embodiments of the present disclosure.

FIG. 2 illustrates the renewable energy microgrid 10 of FIG. 1 with the addition of a system 35 for electric vehicle charging and hydrogen fueling ("an EV charging/fueling system 35") according to some embodiments of the present disclosure. The EV charging/fueling system 35 comprises an electrolyzer 40, a compressor 50, one or more pressure vessels 60, one or more fuel cells 70, power electronics circuitry 74, a charging system 56, and a charging station 25. The electrolyzer 40 and compressor 50 are operably coupled to utilize the excess energy generated by the renewable resources (e.g., coupled to the energy generated by the one or more of the wind turbines 12, and/or coupled to the energy generated by one or more of the solar cells 14 within the renewable energy microgrid 10). Additional components in the EV charging/fueling system 35 may additionally be operably coupled in the same or similar manner as needed.

The electrolyzer 40 is a system that uses electricity to break water into hydrogen and oxygen through a process called electrolysis. Electrolysis utilizes direct current to split the water into its elemental components of oxygen and hydrogen. Pure oxygen is heavier than pure hydrogen, and the gases are able to be separated as hydrogen will flow to the top of the separated gas mixture and the oxygen will sink to the bottom of the separated gas mixture. The oxygen can then be released to the atmosphere without impact on the environment.

In certain embodiments, the electrolyzer 40 is supplemented or replaced with another type of reformer. These other reformers may be steam reformers, catalyst reformers, or combustion reformers that produce hydrogen gas from methanol, ethanol, natural gas, propane, gasoline, diesel, or other fuels. Other types of reformers can comprise biomass reformers to produce hydrogen from methane, distiller's grains, sugar beet pulp, or other renewables from agricultural products.

The compressor 50 comprises a hydrogen compressor that increases the pressure of hydrogen gas by reducing its volume resulting in compressed hydrogen gas. The compressor 50 receives uncompressed hydrogen gas from the electrolyzer 40 at an inlet and outputs the compressed hydrogen gas to the pressure vessel 60. The pressure vessel 60 stores the compressed hydrogen gas received from the compressor 50. Storage of hydrogen as a gas typically requires high-pressure tanks (e.g., 350-700 bar [or 5000-10,000 psi] tank pressure). The pressure vessel 60 is typically of steel construction and may be fixed in position (e.g., stationary). The pressure vessel 60 holds the hydrogen gas at a pressure greater than ambient pressure. The pressure vessel 60 can be of indeterminate size and is not fundamentally limited in size due to mechanical limitations.

The stored hydrogen in the pressure vessel 60 is made available for fueling electric vehicles at the charging station 25. In FIG. 2, the charging station 25 is shown to include a hydrogen gas dispenser 54 for dispensing hydrogen gas to an FCEV 55. The hydrogen gas dispenser 54 may be referred to as electric vehicle service equipment (EVSE) or be part of the EVSE. The stored hydrogen gas may be controlled (e.g., released) from the pressure vessel 60 and supplied via the hydrogen gas dispenser 54 (e.g., on demand and/or in response to a signal) via a tube or a pipe by opening and closing of a valve 52 of a solenoid or other suitable mechanisms.

The stored hydrogen in the pressure vessel 60 is also made available for use by the fuel cell 70 to convert the hydrogen to electricity. More particularly, the fuel cell 70 generates electricity from an electrochemical reaction through use of an anode, cathode and electrolyte membrane. The fuel cell 70 passes hydrogen through the anode and oxygen gas through the cathode. Oxygen gas may be made available from an oxygen tank 72 or the open air. At the anode, a catalyst splits the hydrogen molecules into electrons and protons. The protons pass through the porous electrolyte membrane, while the electrons are forced through a circuit, generating an electric current and a byproduct of excess heat. At the cathode, the protons, electrons and oxygen combine to produce a byproduct of water molecules, which can be released into the atmosphere.

The direct output of the fuel cell 70 is a DC voltage which may vary widely and have a limited overload capacity. The electrical output of the fuel cell 70 may also be slow to respond to load changes, as it is based on a chemical reaction, and may also have a slow startup. Electrical energy directly from the fuel cell 70 is also not specifically adapted for effective battery charging.

For these reasons, the output of the fuel cell 70 is provided to the power electronics circuitry 74. The power electronics circuitry 74 may include one or more electrical storage elements (e.g., batteries, supercapacitors, or a combination of such components) for stabilizing the voltage from the fuel cell 70. The power electronics circuitry 74 may also include one or more DC-to-DC converters for increasing or boosting the DC voltage. Even further, the power electronics circuitry 74 may include one or more inverters (or DC-to-AC converters) to convert the (e.g., boosted, stabilized) DC signal to an AC signal. The use of synchronized inverters in the power electronics circuitry 74 may provide single phase, split phase, or three phase voltages.

The output of the power electronics circuitry 74 may be coupled to the charging system 56. More particularly, the electricity from the power electronics circuitry 74 (e.g., the AC signal from the one or more inverters) may electrically power the charging system 56. The charging system 56 may be provided as part of the charging station 25 as shown in FIG. 2, however in other embodiments is provided separate and apart from the charging station 25.

The charging system 56 is operative to perform battery charging for electrically charging batteries of battery electric vehicles. In FIG. 2, the charging station 25 is shown to include an electric vehicle charging dispenser 58 for dispensing electricity (e.g., on demand and/or in response to a signal) for charging a battery of a BEV 60. The electric vehicle charging dispenser 58 may be referred to as EVSE or be part of the EVSE. The charging system 56 is coupled in between power electronics circuitry 74 and the electric vehicle charging dispenser 58.

The charging system 56 may perform electrical charging that is specific to vehicle make, vehicle model, and/or the topology of the battery design of the electric vehicle. In some embodiments, the charging system 56 may include a controller and charging circuitry having a plurality of charging circuits, where the controller operates to select one of the charging circuits based at least on vehicle or battery type information of the battery electric vehicle and operate the selected charging circuit for charging its battery.

In some embodiments, the charging system 56 is a smart charging system, where the controller operates to receive, from another controller (e.g., a cloud controller or the like), instructions for controlling the charging of the battery. The controller may additionally or alternatively receive, from the other controller (e.g., a cloud controller or the like), a charging profile for controlling the charging of the battery. The charging profile may be selected based on the vehicle or battery type information of the battery electric vehicle, and/or based on other information including user identity, grid load information, day of the week, and/or time of day.

The renewable energy microgrid 10 includes a system controller 80 which may build upon the microgrid controller 10 of FIG. 1. More particularly, the components of the renewable energy microgrid 10 and/or the EV charging and fueling system 35 may be monitored, managed, and/or controlled with the system controller 80 via a telemetry system. In some embodiments, a cloud storage 90 having one or more cloud databases 92 and a cloud management 94 having one or more cloud controllers 96 or servers are utilized to provide storage, management, and control the renewable energy microgrid 10 and/or the EV charging and fueling system 35.

Here, a network of transducers, sensors, Internet of Things (IoT) devices, and other communicating electronics across the renewable energy microgrid 10 and/or the EV charging and fueling system 35 are in communication with the system controller 80. This communication may be provided for determining operating conditions and providing (e.g., precise) control and oversight of the components of the renewable energy microgrid 10 and/or the EV charging/fueling system 35. As is apparent, the telemetry system may be used in combination with cloud storage 90 and cloud management 94 to remotely assess the operation and status of the components and/or to remotely manage the different components as needed.

In some embodiments, activities and information associated with electric charging and hydrogen fueling at the EV charging/fueling system 35 are monitored, collected, and stored. For example, hydrogen gas transfer information associated with the hydrogen fueling of an FCEV may be monitored, collected, and stored; and charge transfer information associated with the charging of the battery of a BEV may be monitored, collected, and stored.

As illustrated in FIG. 2, the system controller 80 generally includes the components of a processor 81 and a non-transitory memory 82. The processor 81 executes instructions stored in the non-transitory memory 82 and interfaces, via wired and/or wireless communication, with the components of the renewable energy microgrid 10, the EV charging/fueling system 35, and their respective control systems to achieve desired operation. The system controller 80 is additionally in wired or wireless communication with a computing device 83 (e.g., smart phones, smart watches, tablets, laptop computers, desktop computers, servers, embedded systems, and dedicated displays, etc.) enabling the reporting and storage of data reflective of the operation of the renewable energy microgrid 10 and/or the EV charging/fueling system 35, and enabling the remote programming of the system controller 80. In FIG. 2, for example, a computing device 66 that is illustrated as a smart phone may be utilized by a user 64 for remote viewing, monitoring, management, and/or control over the renewable energy microgrid 10 and/or the EV charging and fueling system 35. More detailed functionality associated with monitoring and management in relation to the renewable energy microgrid and/or the EV charging/fueling system 35 is described later.

D. Operation of Preferred Embodiment

In use, the electrolyzer 40 and compressor 50 are both powered by the excess energy of the renewable energy microgrid 10. The electrolyzer 40 is supplied with water 42 and uses electricity to split the water 42 into its elemental components of oxygen and hydrogen (i.e., breaking the molecular bond of the water). The oxygen is released into the atmosphere without any environmental or ecological effects, leaving behind only the hydrogen gas. The hydrogen gas from the electrolyzer 40 enters the compressor 50 through an inlet valve, which decreases the total gas volume by increasing the static pressure acting on the gas. The compressor 50 then outputs the hydrogen gas to the pressure vessel 60. The pressure vessel 60 is filled to its capacity with the hydrogen gas once the pressure of the stored hydrogen gas reaches the pressure limits of the pressure vessel, or when the pressure of the stored hydrogen gas reaches the pressure limits of the compressor 50, whichever of the two is smaller. The hydrogen that is stored in the pressure vessel 60 may be connected to a hose, which may be then connected to a hydrogen storage vehicle of the FCEV 55. The pressure of the storage vehicle may be supplemented, boosted, or reduced by secondary compressors before the connection of a FCEV hydrogen storage tank.

When the stored hydrogen gas is used by the fuel cell 70, the hydrogen gas is delivered from the pressure vessel 60 to the fuel cell 70, where the hydrogen gas is converted to DC electricity. The DC electricity is supplied to power electronics circuitry 74. As described previously, the power electronics circuitry 74 may include one or more electrical storage elements, one or more DC-to-DC converters, and/or one or more inverters (or DC-to-AC converters).

Figure 3:
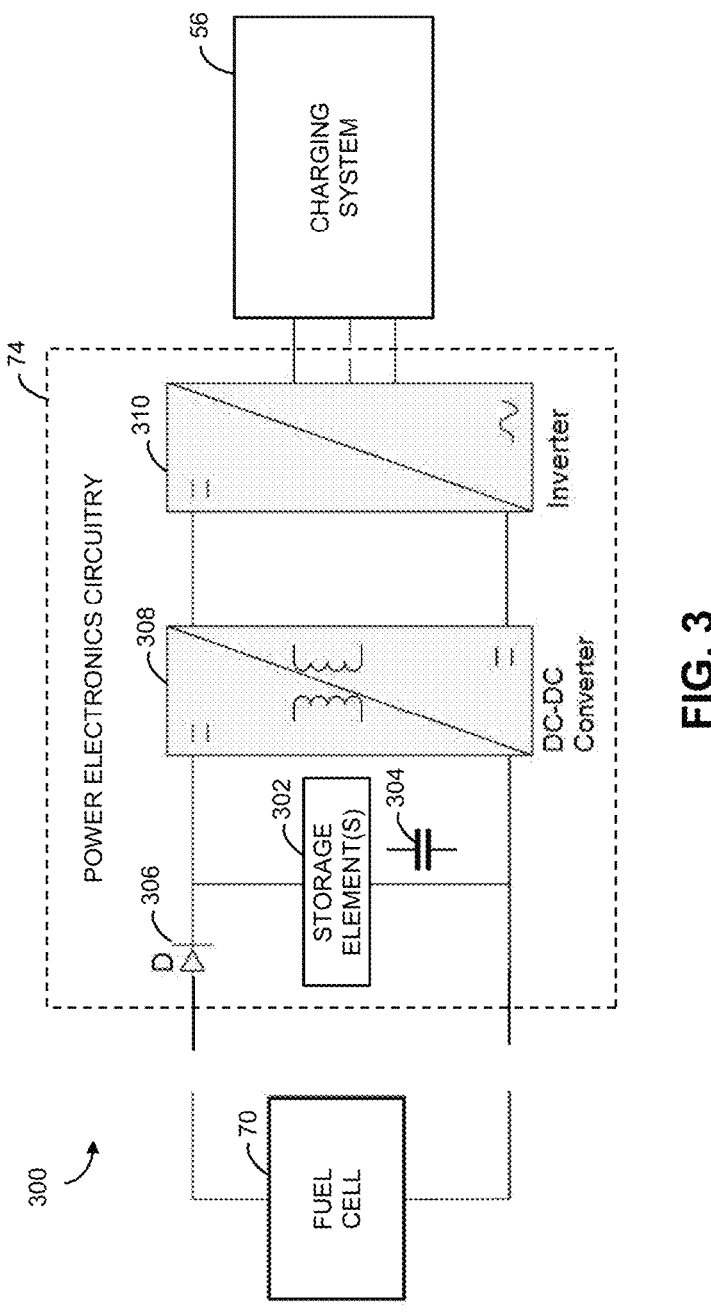
FIG. 3 is a schematic block diagram of an example of power electronics circuitry which may be used in the EV charging/fueling system of FIG. 2 and/or the method of FIG. 6.

With reference now to FIG. 3, a schematic block diagram 300 of an example of power electronics circuitry 74 which may be used in the EV charging/fueling system 35 of FIG. 2 is shown. The power electronics circuitry 74 of FIG. 3 includes one or more electrical storage elements 302 (e.g., one or more supercapacitors 304, one or more batteries, or combinations thereof), one or more DC-to-DC converters 308, one or more inverters 310, and one or more additional components (e.g., a diode 306 at the input). The one or more electrical storage elements 302 may assist in stabilizing the DC voltage from the fuel cell 70. The DC-to-DC converter 308 operates to increase or boost the DC voltage for the one or more inverters 310. The inverter 310 operates to convert the (e.g., boosted, stabilized) DC signal to an AC signal. The use of synchronized inverters in the power electronics circuitry 74 may provide single phase, split phase, or three phase voltages.

The electricity from the power electronics circuitry 74 (e.g., the AC signal from the one or more inverters) may electrically power the charging system 56. The charging system 56 operates to perform battery charging for electrically charging batteries of battery electric vehicles. In some embodiments, the charging system 56 may operate to perform electrical charging tasks that are specific to the vehicle make, the vehicle model, and/or the topology of the battery design of the electric vehicle.

Figure 4:
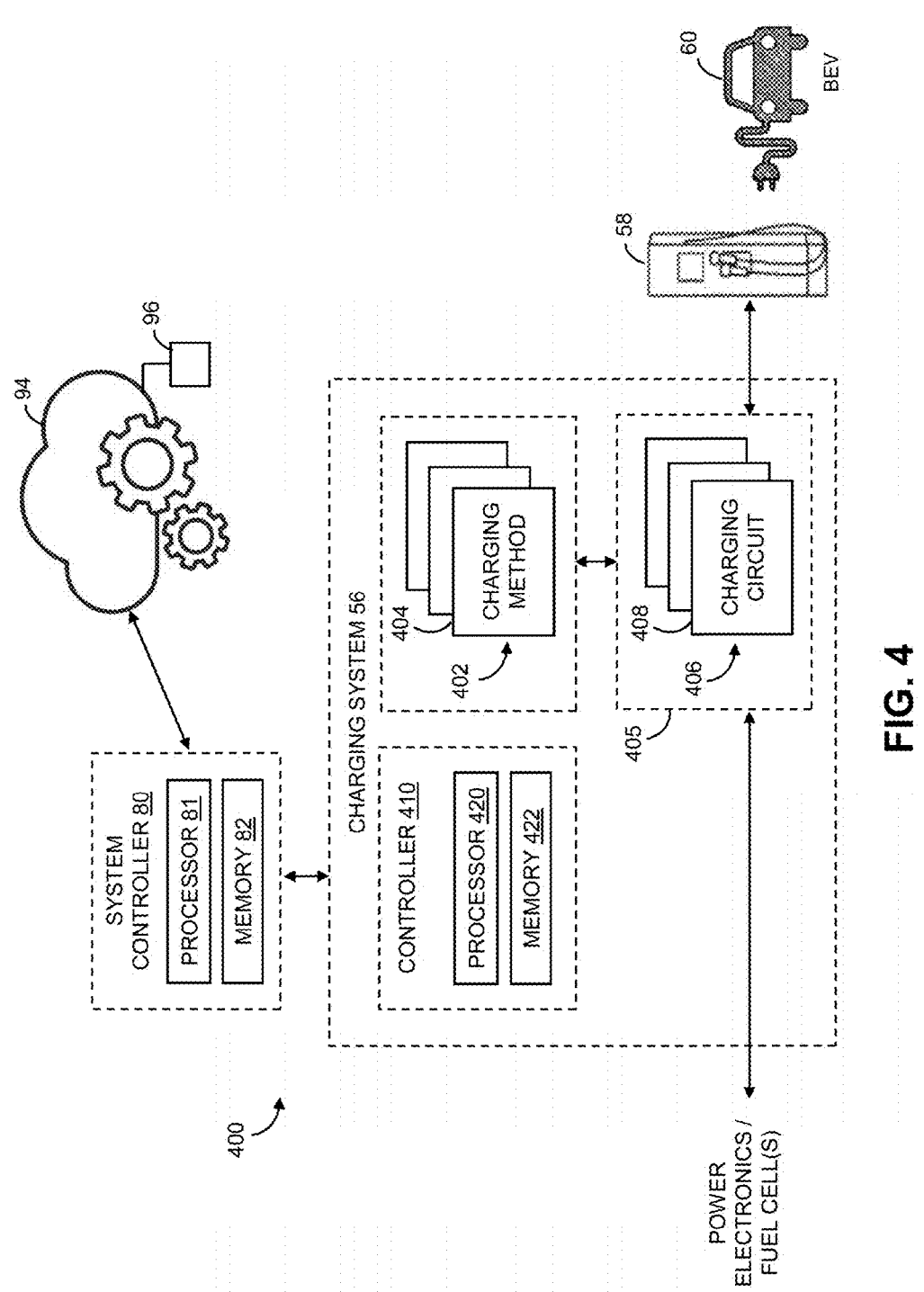
FIG. 4 is a schematic block diagram of an example of a charging system which may be used in the EV charging/fueling system of FIG. 2 and/or the method of FIG. 6.

With reference now to FIG. 4, a schematic block diagram 400 of an example of a charging system 56 which may be used in the EV charging/fueling system 35 of FIG. 2 is shown. The charging system 56 of FIG. 4 includes a controller 410 and charging circuitry 405 having a plurality of charging circuits 406 (or charging circuit portions). The controller 410 generally includes the components of a processor 420 and a non-transitory memory 422. The processor 420 executes instructions stored in the non-transitory memory 422 and interfaces with other components of the charging system 56, and/or with system controller 80 and/or cloud controller 96 (via wired and/or wireless communication) if and as needed to achieve desired operation. The controller 410 operates to select one of the charging circuits 406 (or charging circuit portions) based at least on vehicle or battery type information of the battery electric vehicle, and operate a selected charging circuit 408 for charging the battery. In addition, or as an alternative, the controller 80 may operate to select one of a plurality of charging methods 402 (e.g., stored in memory 422 or otherwise) based at least on the vehicle or the battery type information of the battery electric vehicle, and operate according to a selected charging method 404 for charging the battery.

In some embodiments, the charging system 56 may comprise a smart charging system. Here, the charging process may additionally include receiving, from a controller (e.g., a cloud controller), instructions for controlling the charging of the battery. The charging process may additional include receiving, from the controller (e.g., the cloud controller), a charging profile for controlling the charging of the battery. Examples processes associated with the smart charging system are described in more detail later below in relation to FIGS. 7 and 8.

Figure 5:
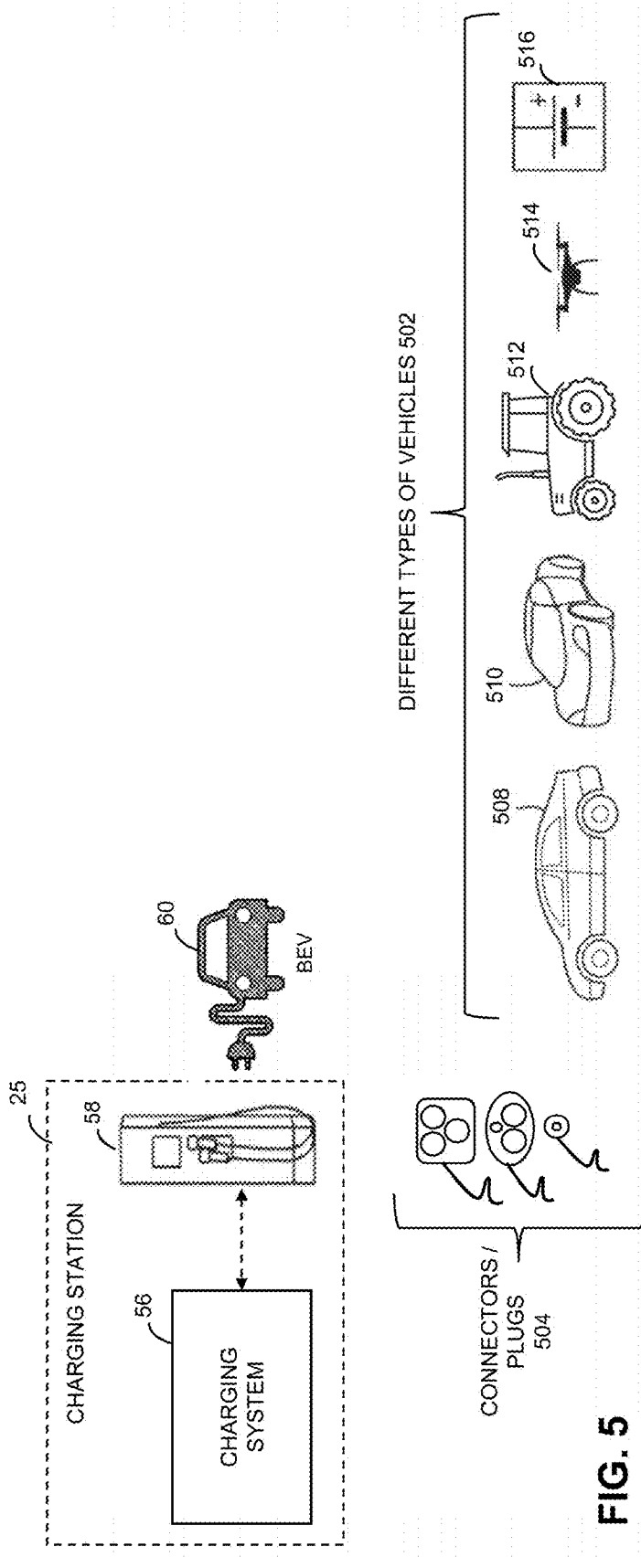
FIG. 5 is an illustrative representation of a plurality of different types of electric vehicles that may be served by the EV charging/fueling system of FIG. 2, with use of a plurality of different types of connectors and plugs for delivering electricity.

As described above, the charging system 56 may operate to perform electrical charging that is specific to the vehicle make, the vehicle model, and/or the topology of the vehicle's battery design. With reference now to FIG. 5, an illustrative representation of a plurality of different types of electric vehicles 502 that may be served by the EV charging/fueling system 35 of FIG. 2 is shown. As illustrated in FIG. 5, electric charging at charging station 25 may be applied to a wide variety of different vehicles 502, which include various types of passenger vehicles 508 and 510, agricultural vehicles (e.g., a tractor vehicle 512), unmanned aerial vehicles (UAVs) (e.g., a drone 514), and even battery packs or the like (e.g., a battery pack 516). Thus, in addition to the selection and application of the appropriate charging circuits and methods, appropriate electrical charging is further facilitated with use of a plurality of different types of connectors and plugs 504 (provided at the charging station 25) which correspond to the different types of vehicles 502.

As is apparent, owners of various electric vehicles are able to recharge or refuel their vehicles—whether BEVs 60 or FCEVs 55—at a charging station which utilizes excess renewable energy of a renewable energy microgrid. A first portion of stored hydrogen gas may be used for hydrogen fueling of the FCEV 55 via the hydrogen fuel dispenser 54 that is provided at the charging station 25. A second portion of the stored hydrogen gas may be converted into electricity by the fuel cell 70, and the generated electricity may be used to charge a battery of the BEV 60 via the electric vehicle charging dispenser 58 that is provided at the charging station 25.

The capability to monetize stored energy and to provide local sales of the energy (through use of the charging station 25 located at the renewable energy grid 10) opens up a large number of possibilities. For example, an installation that is producing and storing energy captured from renewable sources may create a revenue stream when their production capacity exceeds their demand. The excess production represents a source of income that was previously non-existent. Specifically, the point-of-use sales for electric vehicle recharging represents a tectonic shift, where hydrogen gas may be created, compressed, and consumed locally. Any location may be suitable for the installation of an electric vehicle recharging station, independent of the locations' position on the electrical grid or on a gas pipeline.

FIG. 6 is a flowchart 600 for describing a method for electric vehicle charging and hydrogen fueling at a charging station located at a renewable energy microgrid according to some embodiments of the present disclosure. Beginning at a start point 602 of FIG. 6, the method includes powering an electrolyzer and a compressor with excess energy generated from a renewable resource within the renewable energy microgrid (step 604 of FIG. 6). The method further includes converting water into hydrogen gas with the powered electrolyzer (step 606 of FIG. 6). The method further includes compressing the hydrogen gas with the compressor (step 608 of FIG. 6). The method further includes delivering the compressed hydrogen gas to one or more pressure vessels (step 610 of FIG. 6). The method further includes supplying a first portion of the compressed hydrogen gas from the one or more pressure vessels to a hydrogen fuel dispenser of the charging station, for fueling a fuel cell electric vehicle at the charging station (step 612 of FIG. 6). The method further includes delivering a second portion of the compressed hydrogen gas from the one or more pressure vessels to a fuel cell (step 614 of FIG. 6). The method further includes generating electricity with the fuel cell (step 616 of FIG. 6). The method further includes supplying the generated electricity to an electric vehicle charging dispenser of the charging station, for charging a battery of a battery electric vehicle at the charging station (step 618 of FIG. 6).

In some embodiments, the generating of the electricity with the fuel cell in step 616 may further include combining oxygen gas with the second portion of the compressed hydrogen gas at the fuel cell. In some embodiments, the method may additionally include converting a DC signal of the generated electricity (i.e., from step 616) to an AC signal; supplying the AC signal to a charging system coupled to the electric vehicle charging dispenser; and charging the battery with use of the charging system (i.e., in step 618). In some embodiments, the charging system comprises a plurality of charging circuits, and the method may additionally include selecting one of the plurality of charging circuits of the charging system based at least on vehicle or battery type information of the battery electric vehicle; and operating the selected charging circuit for charging the battery (i.e., in step 618).

In some embodiments, the charging system comprises a smart charging system, and the method for electric vehicle charging and hydrogen fueling may additionally include receiving, from a controller, instructions for controlling the charging of the battery. In some embodiments, the method for electric vehicle charging and hydrogen fueling may additional include receiving, from a controller, a charging profile for controlling the charging of the battery.

In some embodiments, the method may additionally include monitoring and collecting of data and/or information for storage (e.g., cloud-based storage via the telemetry system). In some applications, the dispensed hydrogen gas and the dispensed electricity may be utilized as salable products for which money can be exchanged. In some of these embodiments, the method may additionally include monitoring and collecting hydrogen gas transfer information associated with the hydrogen fueling of the fuel cell electric vehicle; and monitoring and collecting charge transfer information associated with the charging of the battery of the battery electric vehicle.

Figure 7:
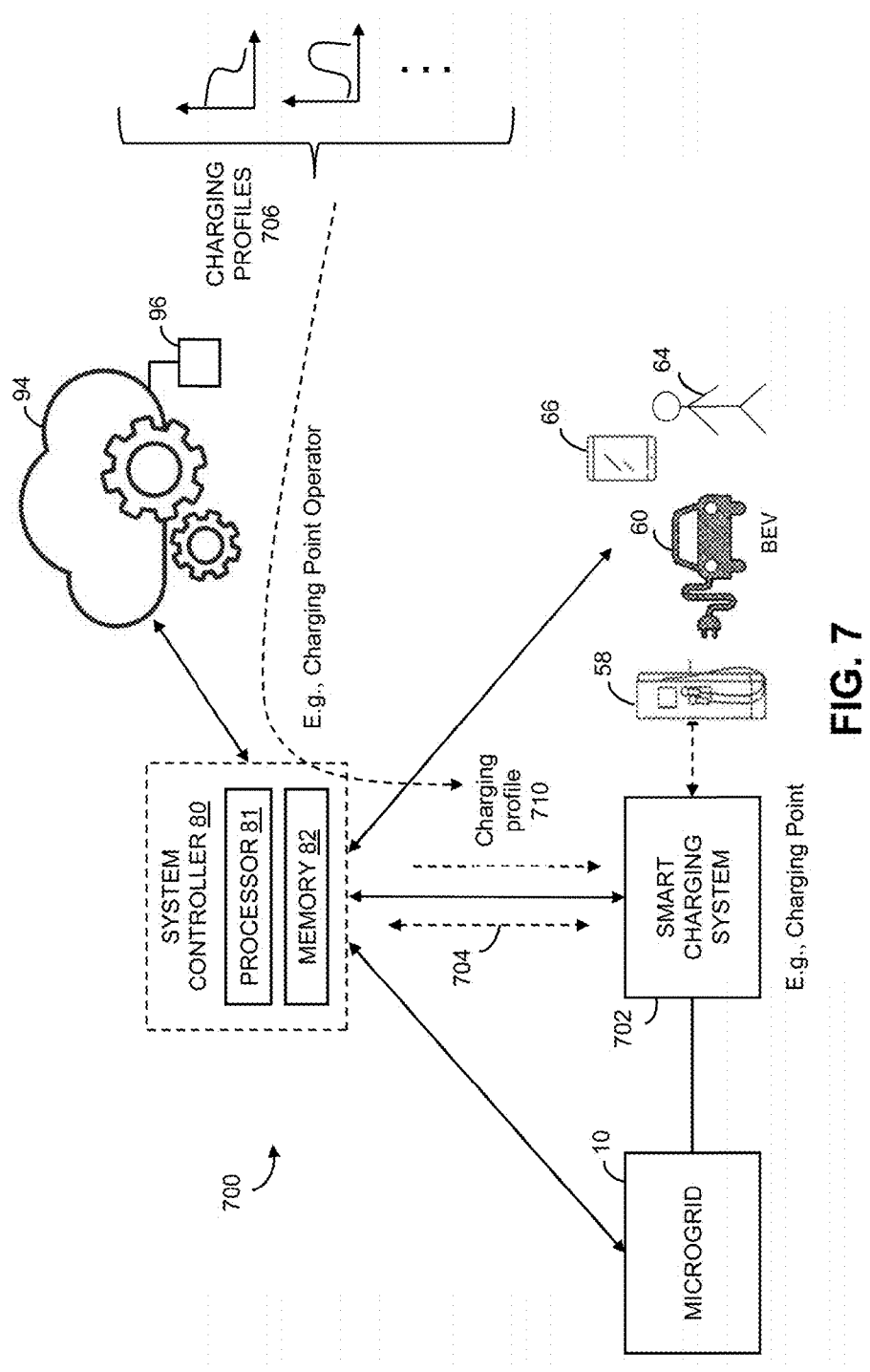
FIG. 7 is a schematic block diagram of an example of a smart charging system which may be used in the EV charging/fueling system of FIG. 2 and/or the method of FIG. 6.

FIG. 7 is a schematic block diagram 700 of an example of a smart charging system 702 which may be used in EV charging/fueling system 35 of FIG. 2 and the method of FIG. 6. As described previously, the charging system may perform electrical charging that is specific to vehicle make, vehicle model, and/or the topology of the battery design of the electric vehicle. In the discussion associated with FIGS. 4 and 5, the charging system included a controller and charging circuitry having a plurality of charging circuits/ methods from which to select, and the controller operated to select one of the charging circuits/methods based at least on vehicle or battery type information.

Smart or intelligent charging relates to a system where an electric vehicle and a charging device share a data connection, and the charging device shares a data connection with a charging operator (e.g., in the cloud). Smart charging allows the owner of the charging station to monitor, manage, and even restrict use of the charging device remotely. The electrical charging at the charging device may be controlled or performed remotely in a smart and efficient manner, taking into consideration many factors. Smart charging may involve the sending of charging or load profiles and/or instructions to the charging device, and be used for load balancing, peak reductions, cost-based optimizations, or other. According to some communication protocols for smart charging (e.g., Open Charge Point Protocol, or OCPP), the charging device may be referred to as a charging point and the charging operator may be referred to as a charging point operator.

In FIG. 7, smart charging system 702 includes a controller (e.g., the controller 410 of FIG. 4) that operates to receive, from another controller (e.g., locally from the system controller 80, or remotely from the cloud controller 96), instructions or requests for controlling the charging of the battery (indicated as communications 704 in FIG. 7). Communications associated with the instructions or requests may be performed according to a predetermined protocol (e.g., OCPP). The controller may additionally or alternatively receive, from the other controller (e.g., locally from the system controller 80, or remotely from the cloud controller 96), a charging profile for controlling the charging of the battery (indicated as a charging profile 710 in FIG. 7). The charging profile 710 may be generated or selected from a plurality of different (possible) charging profiles 706. In some embodiments, the charging profile 710 may include a plurality of parameters, such as starting time, charging period, initial start of charge (SoC), and/or other. The charging profile 710 may be generated or selected (e.g., locally by the system controller 80, or remotely by cloud controller 96) based on the various information, including vehicle or battery type information of the battery electric vehicle, and/or other information including user identity, grid load information, day of the week, and/or time of day.

Figure 8:
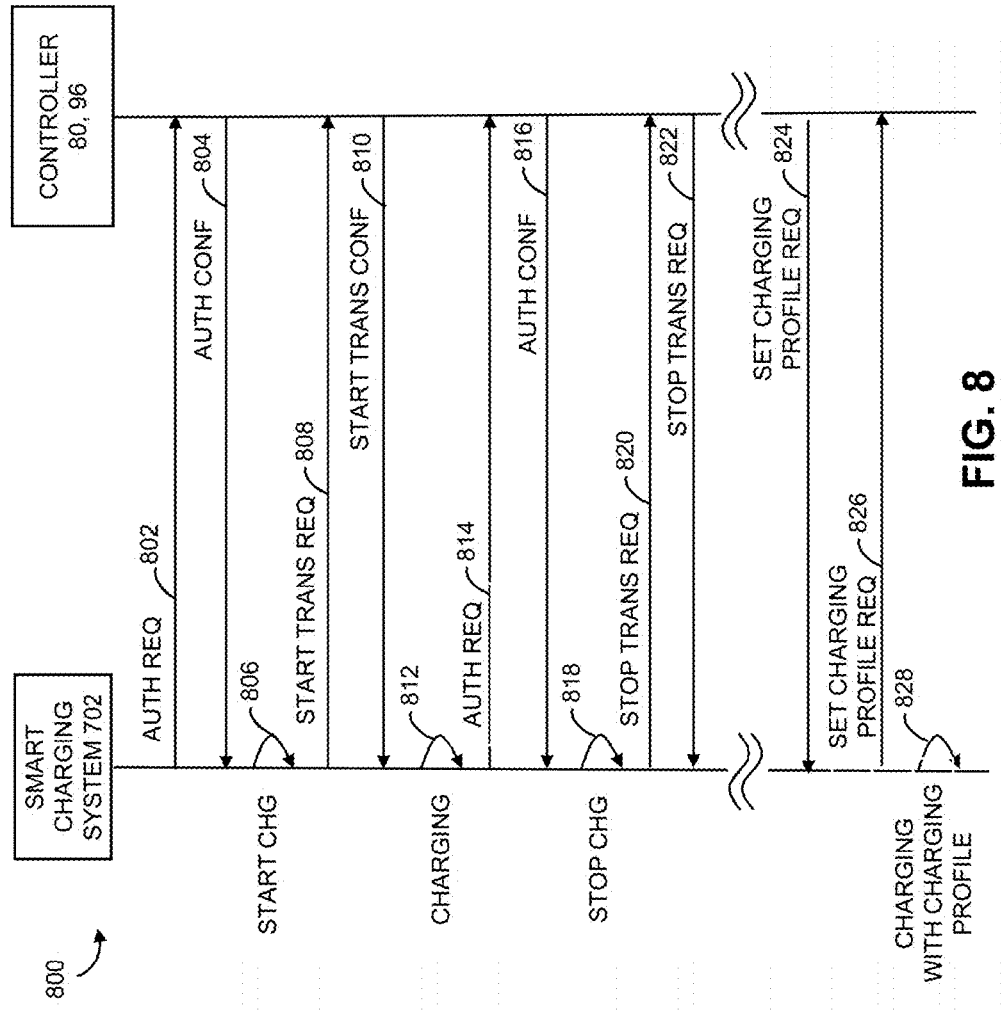
FIG. 8 is a message flow diagram of an message flow of communications for smart charging with use of the smart charging system of FIG. 7.

FIG. 8 is a message flow diagram 800 of an example message flow of communications for smart charging with use of the smart charging system 702 of FIG. 7. The smart charging system 702 operates to interface for communication with a controller (e.g., the system controller 80, or the cloud controller 96) for controlling its charging circuitry. The smart charging system 702 connected to electric vehicle charging dispenser 58 may correspond to a charging point, and the controller 80, 96 may correspond to a charging point operator. To begin, the smart charging system 702 may send to controller 80, 96 a message which indicates an authorization request for authorization (step 802 of FIG. 8). In response, the controller 80, 96 may perform authorization, and send to smart charging system 702 a message which indicates an authorization confirmation (step 804 of FIG. 8). The smart charging system 702 may then begin charging processes (step 806 of FIG. 8), and send to controller 80, 96 a message which indicates a start transaction request for starting the transaction (e.g., meter start, timestamp) (step 808 of FIG. 8). In response, the controller 80, 96 may note the start of the transaction and send to smart charging system 702 a message which indicates a start transaction confirmation (step 810 of FIG. 8). The smart charging system 702 may then perform charging of the battery (step 806 of FIG. 8).

After some time has passed, the smart charging system 702 may send to controller 80, 96 another message which indicates an authorization request for authorization (step 814 of FIG. 8). In response, the controller 80, 96 may perform authorization, and send to smart charging system 702 a message which indicates an authorization confirmation (step 816 of FIG. 8). The smart charging system 702 may then stop charging the battery (step 818 of FIG. 8), and send to controller 80, 96 a message which indicates a stop transaction request for stopping the transaction (e.g., meter stop, timestamp) (step 820 of FIG. 8). In response, the controller 80, 96 may note the stop of the transaction and send to smart charging system 702 a message which indicates a stop transaction confirmation (step 822 of FIG. 8).

In the above-described message flow, the controller 80, 96 may send to the smart charging system 702 a message which indicates a set charging profile request (step 824 of FIG. 8). This message may include a charging profile for charging the battery. In response, the smart charging system 702 may send to the controller 80, 96 a message which indicates a set charging profile confirmation (step 826 of FIG. 8). The smart charging system 702 will then perform the charging of the battery in accordance with the charging profile (step 828 of FIG. 8, but previously as step 812 of FIG. 8).

As described previously, the renewable energy grid 10 and the EV charging/fueling system 35 make use of a telemetry system for remote monitoring, management, and control. Telemetry involves the automatic measurement and wireless transmission of data from remote sources. In general, telemetry operates with use of sensors that measure either electrical data (such as voltage and current) or physical data (such as temperature and pressure), and the measured data are sent (via computer networks) to a remote location for display and processing according to user specifications as needed (e.g., for monitoring and analysis).

As noted previously, the system controller 80 generally includes the components of the processor 81 and the non-transitory memory 82. The processor 81 executes instructions stored in the non-transitory memory 82 and interfaces, via wired and/or wireless communication, with the components of the renewable energy microgrid 10, the EV charging/fueling system 35, and their respective control systems to achieve desired operation. The system controller 80 is additionally in wired or wireless communication with a computing device 83 (e.g., smart phones, smart watches, tablets, laptop computers, desktop computers, servers, embedded systems, and dedicated displays, etc.) enabling the reporting and storage of data reflective of the operation of the renewable energy microgrid 10 and/or the EV charging/fueling system 35 and enabling the remote programming of the system controller 80.

The system controller 80 includes the functionalities of the microgrid controller 20 (as described previously), as well as other functionalities specific to the EV charging/fueling system 35. In some embodiments, the cloud storage 90 having the one or more cloud databases 92 and the cloud management 94 having the one or more cloud controllers 96 or servers are utilized to provide storage, management, and control the renewable energy microgrid 10 and/or the EV charging and fueling system 35. The functionalities of the system are used to remotely assess the operation and status of all components, and to remotely manage different components as needed. Parameters monitored by the system for desired operation can include, but are not limited to:

(a) Output voltages and output currents of individual solar cells 14 and a solar array comprised of a plurality of the individual solar cells 14;

(b) Output voltages and output current of the wind turbine;

(c) Wind speed, air temperature, humidity, air pressure, rainfall, and wind direction of the environment of the renewable energy microgrid 10 with the EV charging/fueling system 35;

(d) Water pressure and/or water flow to the electrolyzer 40;

(e) Hydrogen and/or oxygen production of the electrolyzer 40;

(f) Internal voltages, pressure, state variables, counters, timers, enumerations, and currents of the electrolyzer 40;

(g) Inlet pressure, output pressure, temperature, input current, input voltage, rotational speed, and vibration of the compressor 50;

(h) Pressure and temperature of the pressure vessel 60 storing hydrogen gas;

(i) Internal voltages, pressures, state variables, counters, timers, enumerations, and currents of the fuel cell 70;

(j) Input and output voltages, input and output currents, state variables, timers, counters, temperatures, phases, frequencies and enumerations of the power electronics circuitry 74/charging system 56.

(k) Electrical charge transferred from the charging station 25 to the batteries of BEVs 60, and the purchasing information of the owners of the BEVs 60; and (l) Hydrogen transferred from the charging station 25 to the hydrogen tanks of the FCEVs 55, and the purchasing information of the owners of the FCEVs 55.

In the monitoring functions, one or more of the listed parameters are available for remote visibility from wired or wireless devices connected to the system controller 80 via one or more network communication channels in communication with the computing device 83. A list of example computing devices 83 that are available for viewing the parameters include, but are not limited to: smart phones, smart watches, tablets, laptop computers, desktop computers, servers, embedded systems, and dedicated displays.

Remote management functions may be accessed through a secure network entry point via one or more of the example devices noted above. Management functionalities include the ability to turn on or turn off components of the renewable energy microgrid and/or the EV charging/fueling system 35, adjust settings and change parameters utilizing a wired or wireless network communication channel. Notably, a qualified user does not need to be physically near the components to make adjustments as the network communication between the computing device 83 and the system controller 80 enable real-time interaction with the renewable energy microgrid and/or the EV charging/fueling system 35.

Further, the ability to remotely and securely access the renewable energy microgrid and/or the EV charging/fueling system 35 enables visibility of the overall installation including the magnitude of renewable energy available, the efficiencies of conversion from renewable energy to direct current electricity, the amount of electricity being consumed instantaneously or over a period of time, and the amount of energy that is consumed from excess production to stored energy in the form of compressed hydrogen. The ability to remotely and securely access the renewable energy microgrid and/or the EV charging/fueling system 35 also provides dashboard access of operation and status as well as historical information and prediction on future conditions.

Status and operational data collected from the renewable energy microgrid and/or the EV charging/fueling system 35 can be stored locally and/or remotely, e.g., cloud storage 90, enabling access to the data at any time and any place by a computing device. Cloud storage 90 helps to improve the reliability of stored information, as cloud-based storage (e.g., on virtual servers, with storage redundancy) is likely to be less subject to breakdowns, power interruptions, or the threat of viruses, malware, or ransomware. Stored status and operational data can be analyzed and utilized for a large number of purposes, e.g., (a) machine learning to optimize operation of the renewable energy microgrid and/or the EV charging/fueling system 35, (b) customer relationship management by providing the customer insight into operation the renewable energy microgrid 10 and/or the EV charging/fueling system 35; (c) enterprise management; (d) financial forecasting and/or (e) accounting. Status and operational data can also be used to isolate issues in the event of unscheduled interruptions, plan for routine or schedule maintenance, and/or to consider the sales of excess stored energy when demand is less than the forecasted ability to capture and store renewable energy.

Collected status and operational data on the renewable energy microgrid 10 and/or the EV charging/fueling system 35 can also be used for operational purposes, financial purposes, marketing purposes, maintenance purposes, engineering purposes, and/or regulatory purposes. For example, an operational perspective is to determine the amount of stored hydrogen gas and compare it to the forecasted demand, which can be a combination of expected load, expected weather, and expected hydrogen generation capabilities. An operational decision can be made to engage or disengage components to increase or decrease the hydrogen generation capability based on expected conditions.

From a financial perspective, the capability of the localized hydrogen generation is a newly-found ability to store energy from renewable sources such as solar and wind. Without the hydrogen gas storage capability, excess energy (e.g., the amount of energy produced at any instance of time that exceeds the demand at the site of production) would either be unsold or sold to the electrical grid at spot market prices. With the capability of storing hydrogen gas, new financial opportunities exist. Advantageously, the hydrogen gas can be used at a later date for electricity generation.

Marketing purposes for the remote management include, but are not limited to, promoting the hydrogen gas and electrical charging capability to entice customers to purchase the same, or to buy the means for the EV charging/fueling system 35. Engineering purposes for the remote management is to review operational parameters and to make potential adjustments to improve efficiencies, reduce temperatures, pressures, voltages, currents; and to make software adjustments or updates of the renewable energy microgrid 10 and/or the EV charging/fueling system 35. Maintenance purposes for the remote management include the abilities to engage or disengage features/functions for inspections and system improvements of the renewable energy microgrid 10 and/or the EV charging/fueling system 35. Regulatory purposes for the remote management include the ability to provide increased generation for capacity needs or to reduce generation for grid/net/pipeline factors at the renewable energy microgrid 10 and/or the EV charging/fueling system 35.

FIGS. 9 and 10 are illustrative representations of a display 900 of a computing device, showing a visual presentation of various monitored information of the EV charging/fueling system 35 of FIG. 2. In the example of FIG. 9, the information associated with the renewable energy microgrid and the EV charging/fueling system that is monitored in display 900 includes data 902 associated with the Fuel Cell ABC (e.g., Voltage A, Pressure B, Counter C, Timer D, Current E, etc.). The information that is monitored in display 900 also includes data 904 associated with the Power Electronics TUV/Charging System XYZ (e.g., Voltage Input F, Voltage Output G, Current Input H, Current Output I, Current J, etc.). The data 902 and data 904 may be real-time data or previous data associated with a date and time stamp.

In the example of FIG. 10, the information associated with the renewable energy microgrid and the EV charging/fueling system that is monitored in display 900 includes data 1002 associated with a summary of electrical charge transferred to a first user or customer (e.g., Total Electrical Charge Transferred, Date/Time, User Information A, Vehicle Information B, Purchasing Information C, etc.). The information that is monitored in display 900 also includes data 1004 associated with a summary of hydrogen gas transferred to a second user or customer (e.g., Total Electrical Charge Transferred, Date/Time, User Information X, Vehicle Information Y, Purchasing Information Z, etc.).

The systems and methods of the present disclosure are provided to uniquely solve the infrastructure problem for both BEVs and FCEVs, while not shifting the problem to an already-overloaded electrical grid. The systems and methods may facilitate a scalable modular design that allows BEVs to be recharged, and FCEVs to be refilled with compressed hydrogen, using renewable energy sources. The elegance of the renewable energy EV charging station of the present disclosure is the ability to locate the charging station in nearly any location. Currently, charging stations that require a large amount of electrical power for charging or hydrogen generation are restricted to locations that are close to high voltage electrical transmission connections. Similarly, charging stations that require a large amount of gaseous hydrogen must be located close to pipelines containing and transporting hydrogen, or be co-located with significantly larger hydrogen storage systems. The ability for the EV charging and fueling system of the present disclosure to create hydrogen via electrolysis eliminates the requirement of pipeline and/or large vessel colocation. In addition, the ability of the EV charging and fueling system of the present disclosure to create electricity using fuel cells eliminates the requirement of high voltage transmission line colocation. Such a carbon-free system is a radical solution for the infrastructure and promotes electric vehicle transportation over that of ICE vehicle transportation.

Figure 11:
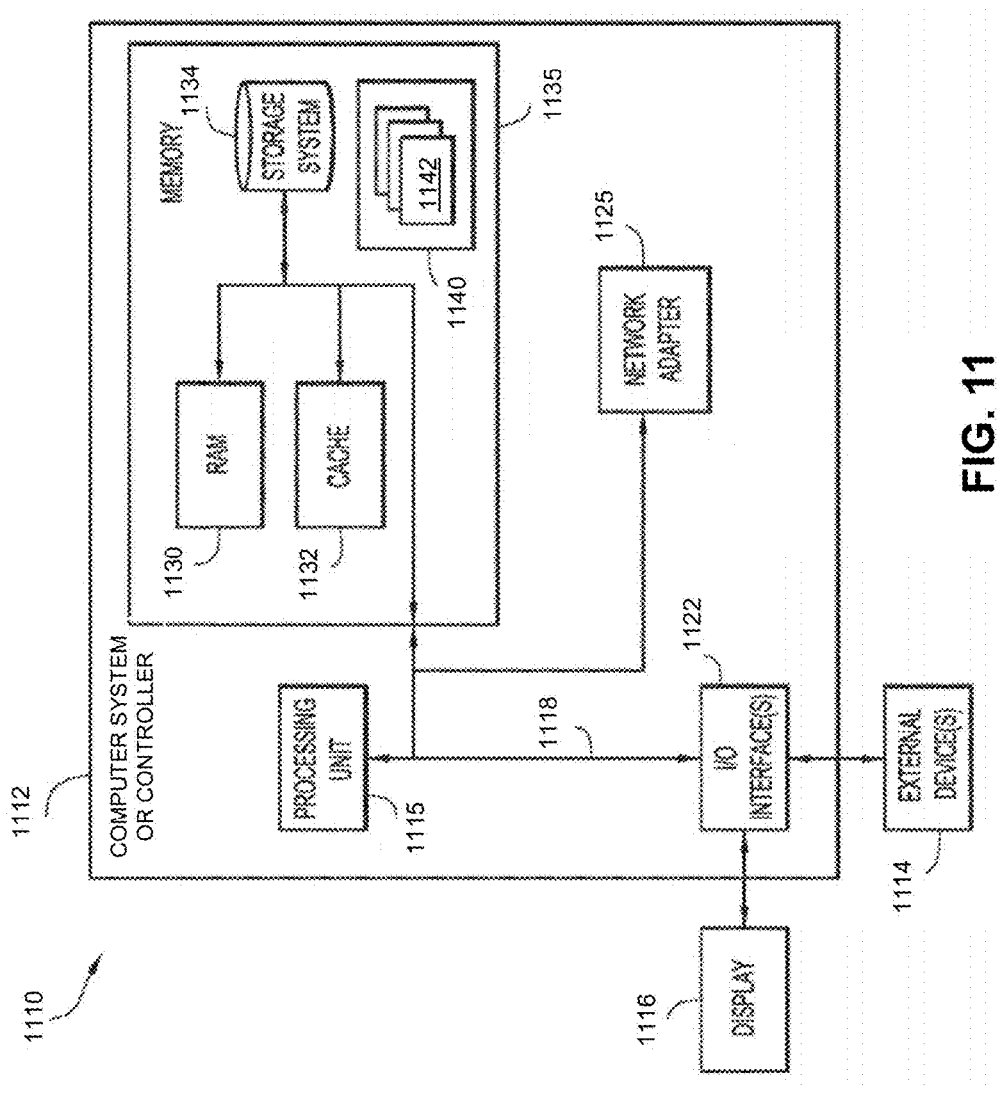
FIG. 11 is schematic block diagram of an example of a computing device which may be utilized in the EV charging/fueling system according to some embodiments.

Referring now to FIG. 11, a schematic diagram of an example of a computing device 1110 which may operate in a computing environment is shown. Computing device 1110 is only one example of a suitable computing device which may be utilized (in whole or in part) in the relevant computing environment(s). For example, computing device 1110 and/or its associated processing may be utilized (in whole or in part) for computing in any one of the controllers, servers, and or devices described herein. The example of FIG. 11 is not intended to suggest any limitation as to the scope of use or functionality of embodiments described herein. Regardless, computing device 1110 is capable of being implemented and/or performing any of the functionality set forth herein.

In computing device 1110, there is a computer system 1112 which is operational with numerous other general purpose or special purpose computing system environments or configurations. Examples of well-known computing systems, environments, and/or configurations that may be suitable for use with computer system 1112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 1112 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 11, computer system 1112 is shown in the form of a general-purpose computing device. The components of computer system 1112 may include, but are not limited to, one or more processors or processing units 1115, a system memory 1135, and a bus 1118 that couples various system components including system memory 1135 to processing units 1115. Bus 1118 represents one or more of any of several types of bus structures, including a memory bus or memory controller, a peripheral bus, an accelerated graphics port, and a processor or local bus using any of a variety of bus architectures.

Computer system 1112 typically includes a variety of computer system readable media. Such media may be any available media that is accessible by computer system 1112, and it includes both volatile and non-volatile media, removable and non-removable media. System memory 1135 can include computer system readable media in the form of volatile memory, such as random access memory (RAM) 1130 and/or cache memory 1132. Computer system 1112 may further include other removable/non-removable, volatile/non-volatile computer system storage media. By way of example only, storage system 1134 can be provided for reading from and writing to a nonremovable, non-volatile magnetic media). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1135 may include at least one program product having a set (e.g., at least one) of program modules that are configured to carry out the desired functions.

Program/utility 1140, having a set (at least one) of program modules 1142 may be stored in memory 1135 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the desired functions and/or methodologies.

Computer system 1112 may also communicate with one or more external devices 1114 such as a keyboard, a pointing device, a display 1116, etc.; one or more devices that enable a user to interact with computer system 1112; and/or any devices (e.g., network card, modem, etc.) that enable computer system 1112 to communicate with one or more other computing devices. Such communication can occur via Input/Output (I/O) interfaces 1122. Still yet, computer system 1112 can communicate with one or more networks such as a local area network (LAN), a general wide area network (WAN), and/or a public network (e.g., the Internet) via network adapter 1125. As depicted, network adapter 1125 communicates with the other components of computer system 1112 via bus 1118. It should be understood that although not shown, other hardware and/or software components could be used in conjunction with computer system 1112. Examples, include, but are not limited to: microcode, device drivers, redundant processing units, external disk drive arrays, RAID systems, tape drives, and data archival storage systems, etc.

The environment of the present invention embodiments may include any number of computer or other processing systems (e.g., client or end-user systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described herein may be modified in any manner that accomplishes the desired functions. In addition, the desired functions may be performed in any order that accomplishes a desired operation.

The software may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Whenever appropriate, terms used in the singular also will include the plural and vice versa. The use of "a" herein means "one or more" unless stated otherwise or where the use of "one or more" is clearly inappropriate. The use of "or"

means "and/or" unless stated otherwise. The use of "comprise," "comprises," "comprising," "include," "includes," "including," "has," and "having" are interchangeable and not intended to be limiting. The term "such as" also is not intended to be limiting. The term "including" shall mean "including, but not limited to."

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A method for electric vehicle charging and hydrogen fueling at a charging station located at a renewable energy microgrid, the method comprising:
    powering an electrolyzer and a compressor with excess energy generated from a renewable resource within the renewable energy microgrid, wherein the renewable energy microgrid operates independently of a central grid;
    converting water into hydrogen gas with the powered electrolyzer;
    compressing the hydrogen gas with the compressor;
    delivering the compressed hydrogen gas to one or more pressure vessels;
    supplying at least a first portion of the compressed hydrogen gas from the one or more pressure vessels to a hydrogen fuel dispenser of the charging station, for fueling a fuel cell electric vehicle at the charging station;
    delivering at least a second portion of the compressed hydrogen gas from the one or more pressure vessels to a fuel cell;
    generating electricity with the fuel cell; and
    supplying the generated electricity to an electric vehicle charging dispenser of the charging station, for charging a battery of a battery electric vehicle at the charging station.

2. The method of claim 1, wherein generating the electricity with the fuel cell further comprises:
    combining oxygen gas with the compressed hydrogen gas at the fuel cell.

3. The method of claim 1, further comprising:
    converting a direct current (DC) signal of the generated electricity to an alternating current (AC) signal;
    supplying the AC signal to a charging system coupled to the electric vehicle charging dispenser; and
    charging the battery with use of the charging system.

4. The method of claim 3, wherein the charging system comprises a plurality of charging circuits, and the method further comprises:

selecting one of the plurality of charging circuits based at least on vehicle or battery type information of the battery electric vehicle; and
    operating the selected charging circuit for charging the battery.

5. The method of claim 3, wherein the charging system comprises a smart charging system, and the method further comprises:
    at the smart charging system,
        receiving, from a controller, instructions for controlling the charging of the battery.

6. The method of claim 3, wherein the charging system comprises a smart charging system, and the method further comprises:
    at the smart charging system,
        receiving, from a controller, a charging profile for controlling the charging of the battery.

7. The method of claim 1, further comprising:
    at a controller,
        monitoring and collecting hydrogen gas transfer information associated with the hydrogen fueling of the fuel cell electric vehicle; and
        monitoring and collecting charge transfer information associated with the charging of the battery of the battery electric vehicle.

8. A system for electric vehicle charging and hydrogen fueling at a charging station located at a renewable energy microgrid, the system comprising:
    an electrolyzer that receives power by excess energy generated by a renewable resource of the renewable energy microgrid, and operates to produce hydrogen gas from water, wherein the renewable energy microgrid operates independently of a central grid;
    a compressor that receives power by the energy generated by the renewable resource of the renewable energy microgrid, and operates to compress the hydrogen gas;
    one or more pressure vessels that store the compressed hydrogen gas;
    a hydrogen fuel dispenser of the charging station that receives supply of at least a first portion of the compressed hydrogen gas from the one or more pressure vessels for fueling a fuel cell electric vehicle at the charging station;
    a fuel cell that receives at least a second portion of the compressed hydrogen gas from the one or more pressure vessels, and operates to generate electricity based on the at least second portion of the compressed hydrogen gas; and
    an electric vehicle charging dispenser of the charging station that receives supply of the generated electricity for charging a battery of a battery electric vehicle at the charging station.

9. The system of claim 8, wherein the fuel cell further operates to generate the electricity based on a combination of oxygen gas with the at least second portion of the compressed hydrogen gas.

10. The system of claim 8, further comprising:
    an inverter that converts a direct current (DC) signal of the generated electricity to an alternating current (AC) signal; and
    a charging system that receives the AC signal and is coupled to the electric vehicle charging dispenser for the charging of the battery.

11. The system of claim 10, wherein the charging system further comprises:
    charging circuitry having a plurality of charging circuits; and a controller that selects one of the plurality of charging circuits based at least on vehicle or battery type information of the battery electric vehicle, and operates the selected charging circuit for the charging of the battery.

12. The system of claim 10, wherein the charging system comprises a smart charging system further including:

charging circuitry; and a first controller that receives, from a second controller, instructions for controlling the charging circuitry for the charging of the battery.

13. The system of claim 10, wherein the charging system comprises a smart charging system further including:

charging circuitry; and a first controller that receives, from a second controller, a charging profile for controlling the charging circuitry for the charging of the battery.

14. The system of claim 10, further comprising:

a controller that monitors and collects hydrogen gas transfer information associated with the hydrogen fueling of the fuel cell electric vehicle, and further monitors and collects charge transfer information associated with the charging of the battery of the battery electric vehicle.

15. A system for electric vehicle charging and hydrogen fueling at a charging station located at a renewable energy microgrid, the system comprising:

an electrolyzer that receives power by excess energy generated by a renewable resource of the renewable energy microgrid, and operates to produce hydrogen gas from water, wherein the renewable energy microgrid operates independently of a central grid;

a compressor that receives power by the energy generated by the renewable resource of the renewable energy microgrid, and operates to compress the hydrogen gas;

one or more pressure vessels that store the compressed hydrogen gas;

a hydrogen fuel dispenser of the charging station that receives supply of at least a first portion of the compressed hydrogen gas from the one or more pressure vessels for fueling a fuel cell electric vehicle at the charging station;

a fuel cell that receives at least a second portion of the compressed hydrogen gas from the one or more pressure vessels, and operates to generate electricity based on the at least second portion of the compressed hydrogen gas and oxygen gas;

power electronics circuitry coupled to receive the generated electricity from the fuel cell;

a smart charging system coupled to the power electronics circuitry, the smart charging system including:

charging circuitry;

a controller that operates to interface for communication with a cloud controller for controlling the charging circuitry; and an electric vehicle charging dispenser of the charging station that is coupled to the charging circuitry for charging a battery of a battery electric vehicle at the charging station.

16. The system of claim 15, wherein the power electronics circuitry further comprises:

an inverter that converts a direct current (DC) signal of the generated electricity to an alternating current (AC) signal.

17. The system of claim 15, wherein the controller operates to receive, from the cloud controller, instructions for controlling the charging circuitry for the charging of the battery.

18. The system of claim 15, wherein the controller operates to receive, from the cloud controller, a charging profile having instructions for controlling the charging circuitry for the charging of the battery.

19. The system of claim 15, wherein the controller operates to interface for communication with the cloud controller comprising a cloud server.

20. The system of claim 15, wherein the controller operates to interface for communication with the cloud controller comprising a charging point operator.

* * * * *